(12) United States Patent
Whipple et al.

(10) Patent No.: US 12,494,115 B2
(45) Date of Patent: Dec. 9, 2025

(54) BROADBAND HAPTIC SYSTEM

(71) Applicant: Valve Corporation, Bellevue, WA (US)

(72) Inventors: Lucas Allen Whipple, Seattle, WA (US); Richard Karstens, Seattle, WA (US)

(73) Assignee: Valve Corporation, Bellevue, WA (US)

( * ) Notice: Subject to any disclaimer, the term of this patent is extended or adjusted under 35 U.S.C. 154(b) by 133 days.

(21) Appl. No.: 18/450,262

(22) Filed: Aug. 15, 2023

(65) Prior Publication Data

US 2025/0061787 A1 Feb. 20, 2025

(51) Int. Cl.
*G08B 6/00* (2006.01)
*G09B 21/00* (2006.01)
*H04B 3/36* (2006.01)

(52) U.S. Cl.
CPC ...................... *G08B 6/00* (2013.01)

(58) Field of Classification Search
CPC ....................................... G08B 6/00
See application file for complete search history.

(56) References Cited

U.S. PATENT DOCUMENTS

| | | | |
|---|---|---|---|
| 7,148,875 B2 * | 12/2006 | Rosenberg ............ | G06F 1/1626 345/157 |
| 7,336,260 B2 | 2/2008 | Martin et al. | |
| 8,749,507 B2 | 6/2014 | DaCosta et al. | |
| 8,913,027 B2 * | 12/2014 | Modarres ............ | G06F 3/016 310/329 |
| 9,116,546 B2 | 8/2015 | Birnbaum et al. | |
| 9,430,042 B2 | 8/2016 | Levin | |
| 10,627,907 B2 | 4/2020 | Venkatesan et al. | |
| 10,665,067 B2 | 5/2020 | Araki et al. | |
| 10,866,655 B2 * | 12/2020 | Kanai .................. | G06F 3/016 |
| 11,079,849 B1 * | 8/2021 | Knoppert ............. | G06F 3/0219 |
| 11,175,738 B2 | 11/2021 | Khoshkava et al. | |
| 11,687,160 B2 * | 6/2023 | Zhao .................... | G06F 3/038 345/157 |
| 2013/0194219 A1 | 8/2013 | Modarres et al. | |
| 2018/0081483 A1 * | 3/2018 | Camp .................. | G06F 3/016 |
| 2020/0103972 A1 | 4/2020 | Amin-Shahidi et al. | |
| 2020/0133397 A1 * | 4/2020 | Mori .................... | G06F 3/016 |
| 2021/0252388 A1 | 8/2021 | VanWyk et al. | |

OTHER PUBLICATIONS

Search Report and Written Opinion for International Application No. PCT/US24/42426, Dated Oct. 30, 2024, 10 pages.

* cited by examiner

*Primary Examiner* — Toan N Pham
(74) *Attorney, Agent, or Firm* — Lee & Hayes, P.C.

(57) ABSTRACT

Described herein is a broadband haptic system for a controller of a controller system to provide enhanced haptic functionality. A control, such as a trackpad, of the controller may include a cover, a circuit board disposed behind the cover and coupled to the cover, a haptic actuator mounted to the circuit board, and a spring disposed behind the cover, the spring being coupled to the cover and mounted to a housing of the controller. The haptic actuator is configured to vibrate and the spring is configured to deflect bidirectionally in response to a vibration of the haptic actuator. Furthermore, the haptic actuator has a first resonant frequency, and the control has a second resonant frequency different than the first resonant frequency to provide a broadband haptic system for the controller.

20 Claims, 16 Drawing Sheets

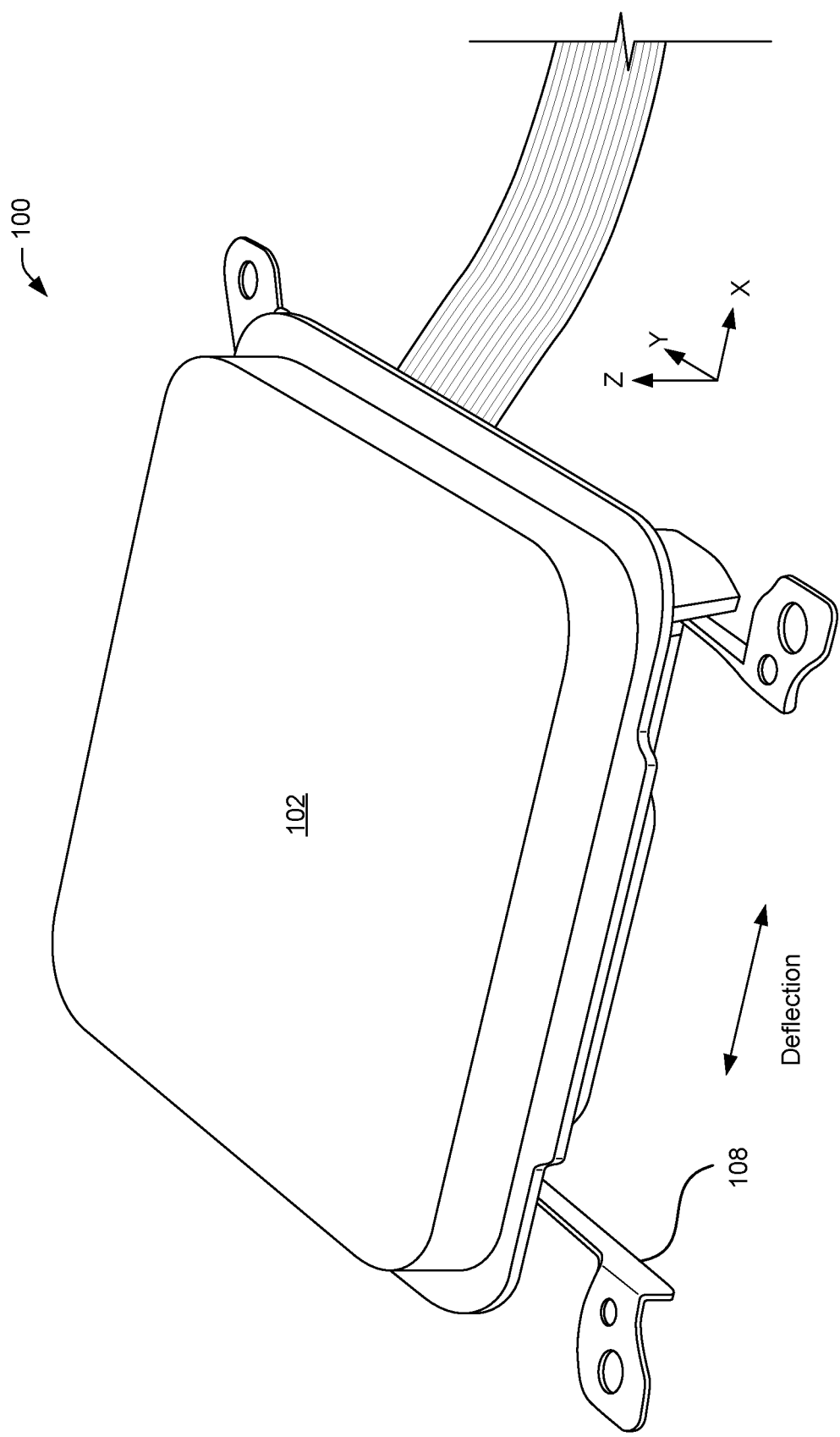

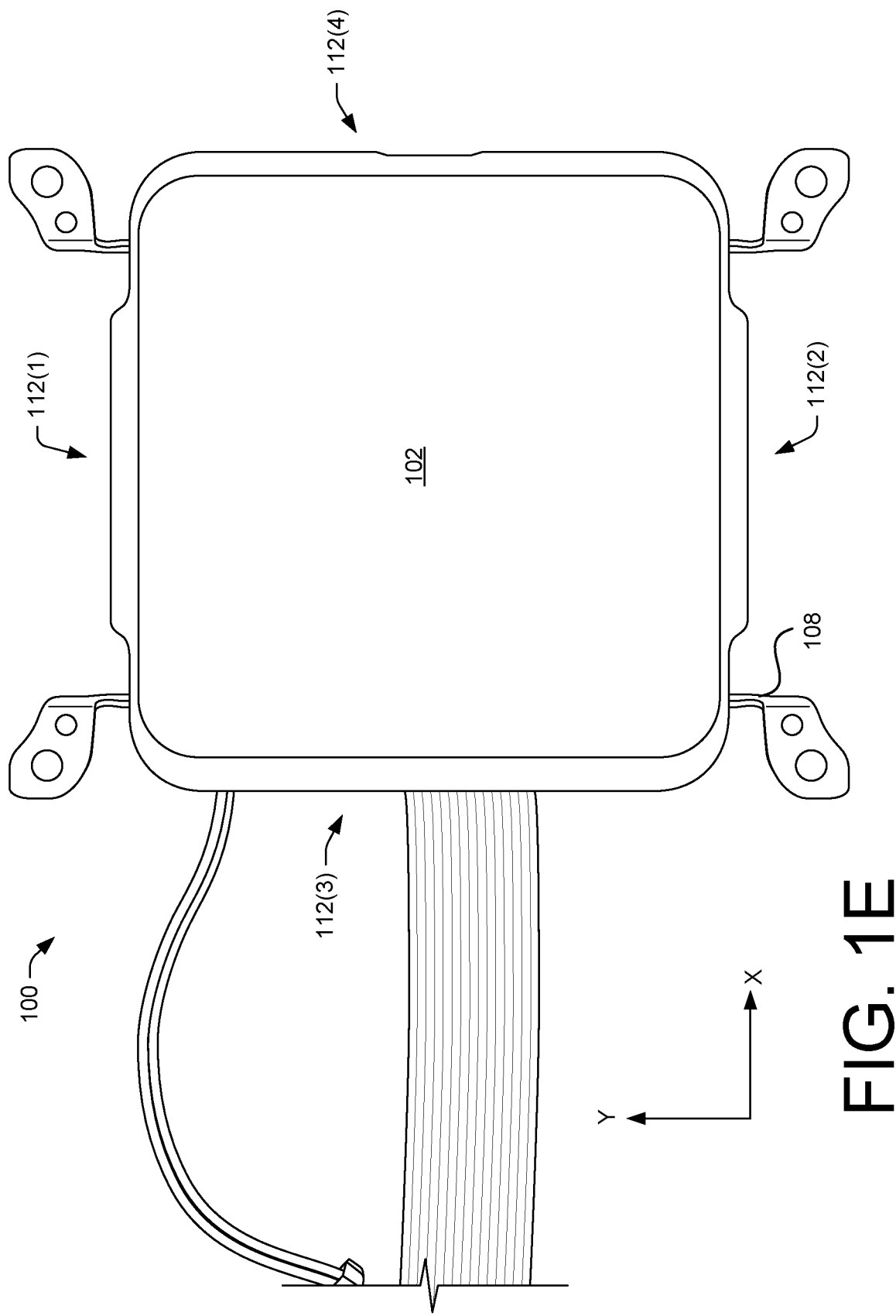

BROADBAND HAPTIC SYSTEM

BACKGROUND

Handheld controllers are used in an array of architectures for providing input, for example, to a local or remote computing device. For instance, handheld controllers are utilized in the gaming industry to allow players to interact with a gaming application executing on a computing device, such as a game console, a game server, the handheld controller itself, or the like. Furthermore, in order to simulate the sense of touch and motion, some handheld controllers are configured to provide haptic feedback to users. Many haptic systems utilize a single-resonance haptic actuator, such as a linear resonant actuator (LRA) with a single resonant frequency. These haptic systems are able to provide only limited types of haptic feedback.

The disclosure made herein is presented with respect to these and other considerations.

BRIEF DESCRIPTION OF THE DRAWINGS

The detailed description is described with reference to the accompanying figures. In the figures, the left-most digit(s) of a reference number identifies the figure in which the reference number first appears. The same, or like, reference numbers in different figures indicate similar or identical items.

FIG. 1A illustrates a perspective view of an example control in the form of a trackpad, the control being shown in the upright orientation in FIG. 1A.

FIG. 1E illustrates a front view of the example control of FIG. 1A.

DETAILED DESCRIPTION

Figure 1B:
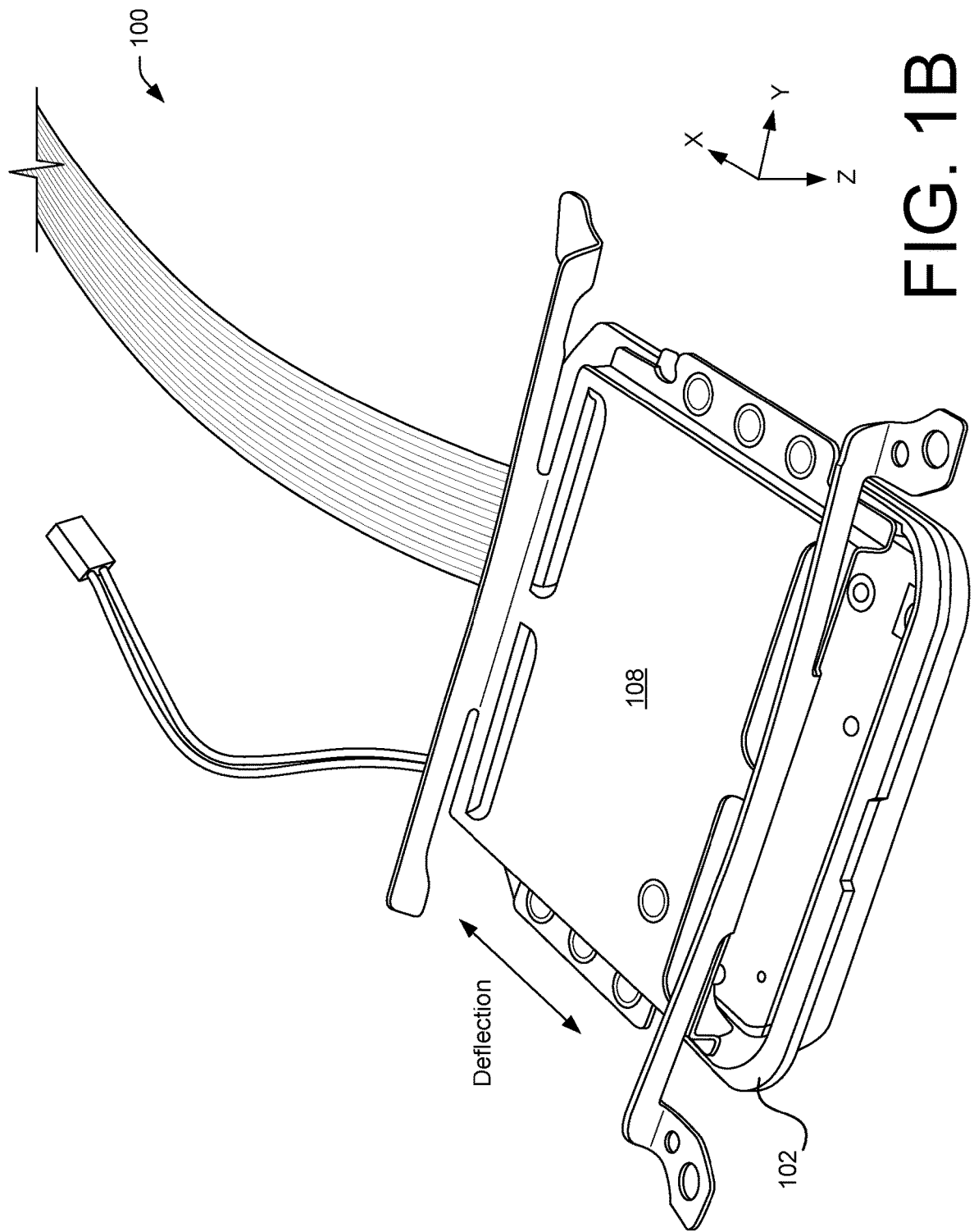
FIG. 1B illustrates a perspective view of the example control of FIG. 1A, the control being shown in the inverted orientation in FIG. 1B.

As mentioned above, handheld controllers are used in a range of environments and include a range of functionality, some controllers including haptic feedback functionality. However, traditional handheld controllers provide only limited types of haptic feedback, which can be due, in part, to a relatively narrow working frequency band of the haptic system implemented in those controllers.

Described herein is, among other things, a broadband haptic system for a controller of a controller system to provide enhanced haptic functionality. The controller has various controls, at least one of the controls including a haptic actuator for providing haptic feedback to a user of the controller. The control with the haptic actuator may further include a spring that is mounted to a housing of the controller, the spring being configured to deflect bidirectionally in response to a vibration of the haptic actuator. As described in more detail below, this spring-mounted control has a resonant frequency that is different than the resonant frequency of the haptic actuator itself. By separating the aforementioned resonant frequencies, the working frequency band of the haptic system is widened (or broadened), thereby creating a broadband haptic system with improved performance, as compared to conventional, narrowband haptic systems. For example, the controller system with the broadband haptic system disclosed herein can impart richer haptic signals to a user of the controller. For example, the disclosed broadband haptic system can provide a variety of high-fidelity waveforms to the user of the controller, thereby improving the experience of the user. Accordingly, the broadband haptic system described herein can allow for providing a wider variety of types of haptic feedback than its narrowband counterparts. In some examples, the types of haptic feedback that can be provided by the disclosed broadband haptic system range from sharp "ticks" to long, rumbling vibrations, as well as intermediate types of haptic responses therebetween.

In some examples, the controls of the controller disclosed herein may be operated by one or more fingers to engage in video game play via an executing video game application, and/or to control other types of applications and/or programs. In some instances, the handheld controller may include controls for controlling a game or application running on the handheld controller itself (e.g., a handheld gaming system that is substantially self-contained on the controller). In some instances, the handheld controller may include controls for controlling a remote device (e.g., a television, audio system, personal computing device, game console, a vehicle, etc.).

In some examples, the spring-mounted control of the controller may be, or include, a trackpad. In some examples, the trackpad is disposed on a front surface of the housing of the controller and is configured to be operated by a thumb of the user while the user is holding the controller (e.g., with two hands). In some examples, the controller includes multiple spring-mounted controls (e.g., multiple spring-mounted trackpads) disposed on the front surface of the housing, each control being operable by a thumb of the user and configured to provide haptic feedback to the user holding the controller.

In some examples, the haptic actuator(s) of the disclosed spring-mounted control(s) may provide haptic feedback in response to one or more criteria being met and/or in response to the occurrence of one or more events. For example, during gameplay of a video game, haptic feedback may be provided, via the haptic actuator(s) of the disclosed spring-mounted control(s), when a player-controlled character is shot by a non-playable character (NPC) in the video game. As another example, the spring-mounted control(s) disclosed herein may include various sensors, such as a touch sensor, a pressure sensor, or the like. In these examples, a processor(s) of the controller system may be configured to detect when a force applied to the control(s) satisfies a threshold, and haptic feedback can be provided in response to the force of a press on the control satisfying the threshold. These are merely examples of when haptic feedback may be provided to the user as a tactile stimulus (e.g., during gameplay), and other criteria may be utilized for providing haptic feedback depending on the implementation.

The disclosed broadband haptic system is more performant than conventional narrowband haptic systems in that it is configured to impart richer haptic signals to a user of the controller. That is, the disclosed broadband haptic system has a wider (or broader) working frequency band than its narrowband counterparts, thereby providing a haptics engineer with more creative freedom and flexibility to program the disclosed controller system with a wide variety of types of haptic feedback responses.

The disclosed broadband haptic system also provides a cost savings to a manufacturer of a control and/or a controller that includes the broadband haptic system. This is because the haptic actuator that is utilized in the disclosed spring-mounted control can be implemented as a single-resonance haptic actuator, such as a LRA with a single resonant frequency, which is much cheaper than a dual-resonance haptic actuator (e.g., a LRA with multiple different resonant frequencies). Nevertheless, the disclosed broadband haptic system can be utilized with such dual-resonance haptic actuators, if desired. Accordingly, the disclosed broadband haptic system can be implemented with a wider variety of types of haptic actuators, which provides more flexibility to a manufacturer of a controller to design the haptic system thereof.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Figure 6:
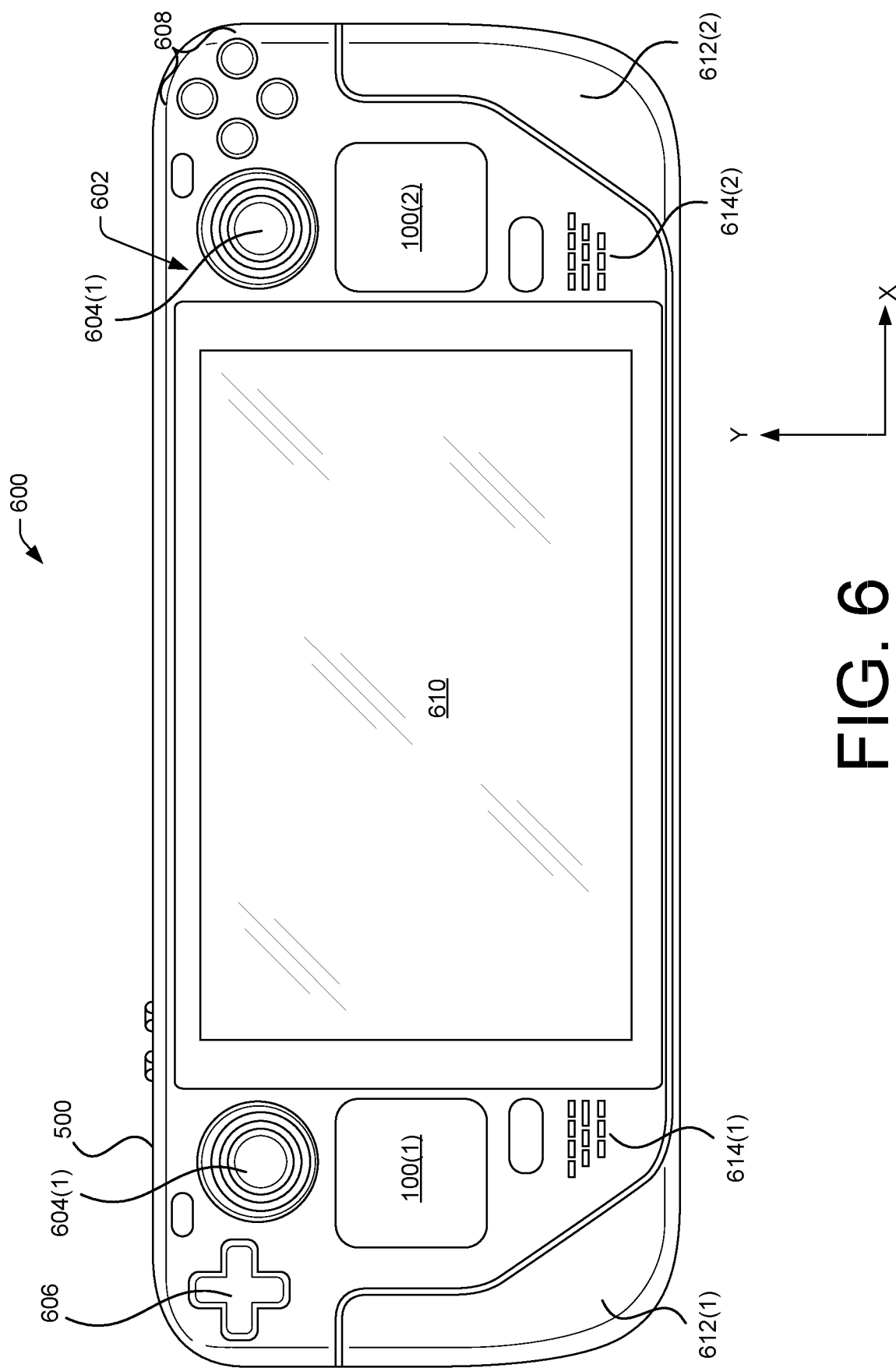
FIG. 6 illustrates a front view of an example controller with example controls for operation by fingers of a user of the controller.

FIGS. 1A-1H illustrate various views an example control 100 in the form of a trackpad. The control 100 may be implemented in a controller. An example of a controller 600 is shown in FIG. 6. The controller 600 may be considered to be "handheld" if the controller 600 is operated by one or more hands of a user, whether or not the entire controller 600 is supported by, or held within, the hand(s) of the user.

The control 100 is configured to be operated by a finger, such as a finger of the user of the controller 600. In this sense, the control 100 is configured to receive input from the user of the controller 600. The example control 100 depicted in FIGS. 1A-1H is in the form of a trackpad, which is configured to sense at least a touch of a finger (e.g., a thumb) on, and/or a proximity of the finger to, the control 100, as well as movement of the finger across the control 100 while the finger is touching, and/or proximate to (e.g., hovering above), the control 100. It is to be appreciated, however, that the control 100 disclosed herein can be implemented as other types of controls besides a trackpad, such as a directional pad (D-pad), a button, a trackball, a joystick, a trigger, a bumper, a knob, a wheel, a paddle, a panel, a wing, or any other suitable type of control that is configured to be operated by a finger.

Figure 5A:
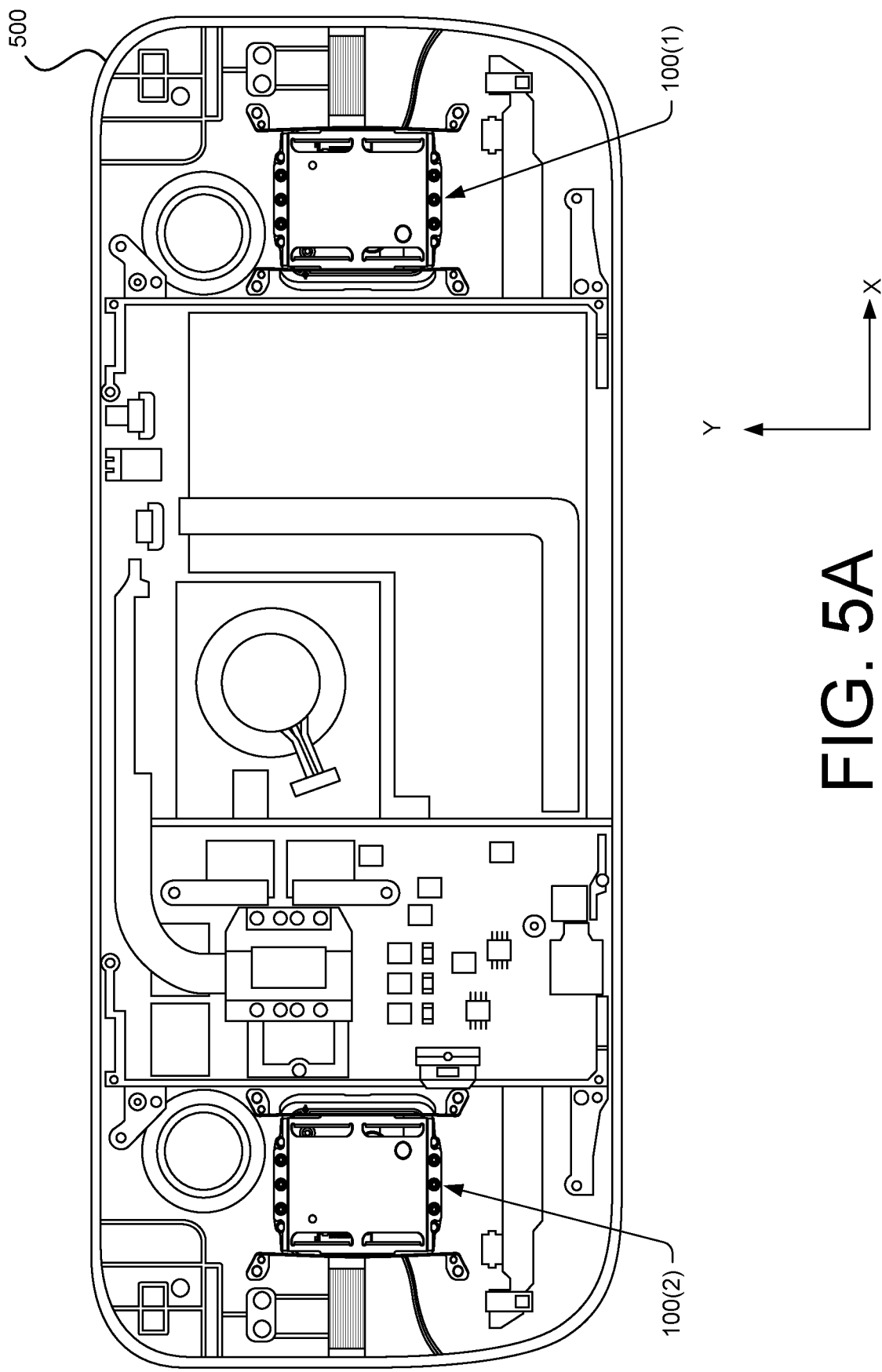
FIG. 5A illustrates a back view of an example controller with a back panel of the controller housing removed to show example controls mounted to the housing.
Figure 5B:
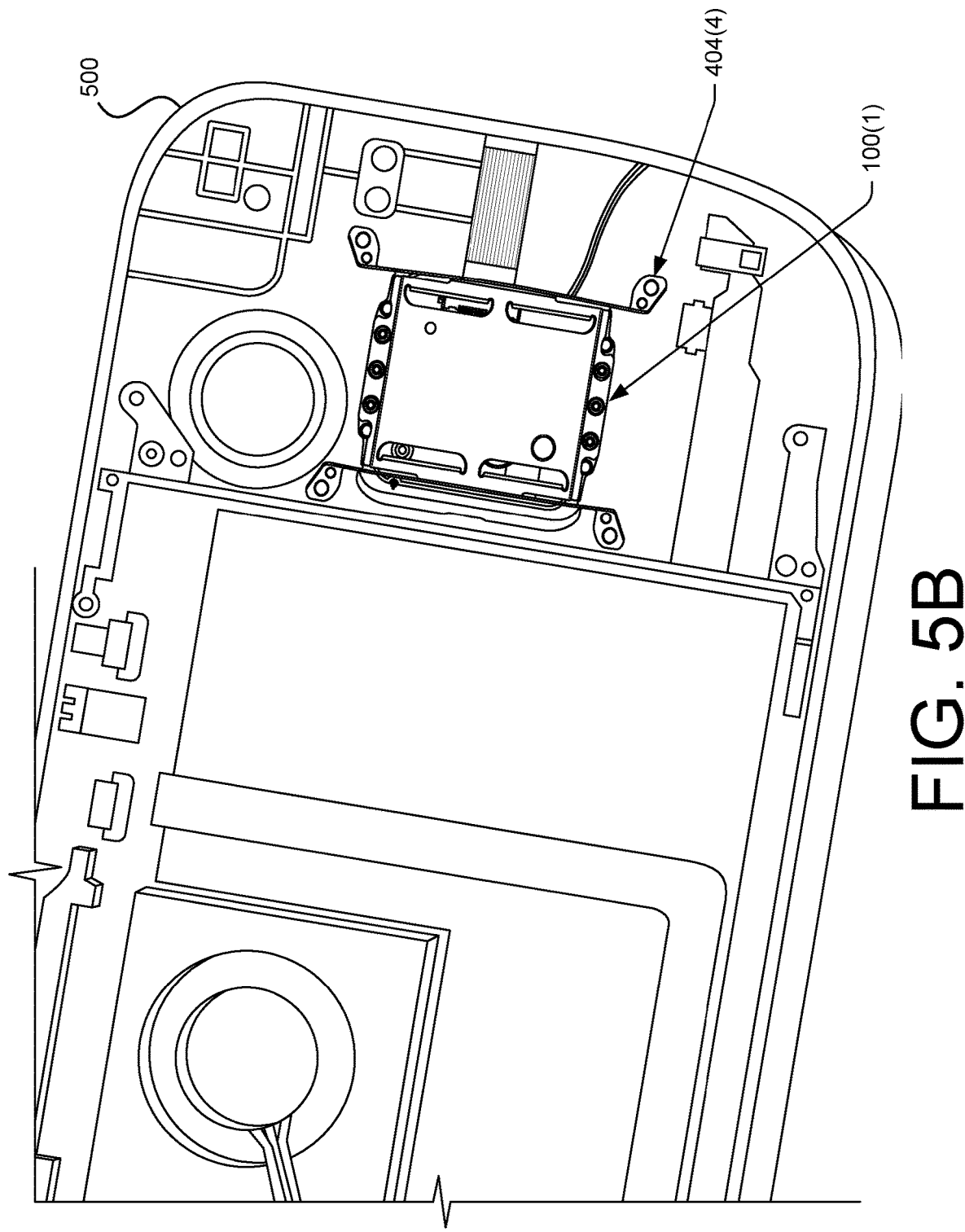
FIG. 5B illustrates a zoomed-in view of one of the controls shown in FIG. 5A.

FIG. 1A illustrates a perspective view of the control 100 in an upright orientation. The control 100 includes a cover 102. The cover 102, as its name implies, may cover the components of the control 100 that are disposed behind the cover 102. Accordingly, because the cover 102 is an externally-facing component of the control 100, the remaining components of the control 100 may be concealed by the cover 102, at least when the control 100 is implemented in a controller, such as the controller 600 of FIG. 6. In some examples, the control 100, and, hence, the cover 102, may be configured to be disposed within an opening defined in a housing of a controller, such as the controller 600. An example of a housing 500 of the controller 600 is shown in FIGS. 5A and 5B. This housing 500 may house the internal components of the controller 600. For instance, the cover 102 may represent the visible part of the controls 100(1) and 100(2) (e.g., trackpads) depicted in FIG. 6, while the internal components within the housing 500 are not visible in FIG. 6. In general, the cover 102 is configured to be interacted with (e.g., hovered over, touched, pressed upon, etc.) in order to operate the control 100. For example, a user may touch the cover 102 with a finger (e.g., a thumb) and/or drag the finger across the cover 102 to move a cursor on a display 610 of the controller 600, or to control some other aspect of an executing application (e.g., to control movement of a player-controlled character, and/or to aim a weapon, in an executing video game). In some examples, a user may operate the control 100 by pressing on the cover 102 (e.g., exerting a force on the cover 102 in the negative Z direction). Because the examples herein contemplate the control 100 being implemented on a front surface 602 of the controller 600, the Z direction shown in the figures is meant to represent a forward (positive Z direction) and backward (negative Z direction) frame of reference. In this sense, components that are disposed in the negative Z direction relative to the cover 102 are referred to as being "behind" the cover 102, although it is to be appreciated that, in other orientations, these components may be referred to as being "underneath" the cover 102, or even "in front of" the cover 102 if the control 100 is disposed on a back surface of the controller 600, for instance.

Figure 1C:
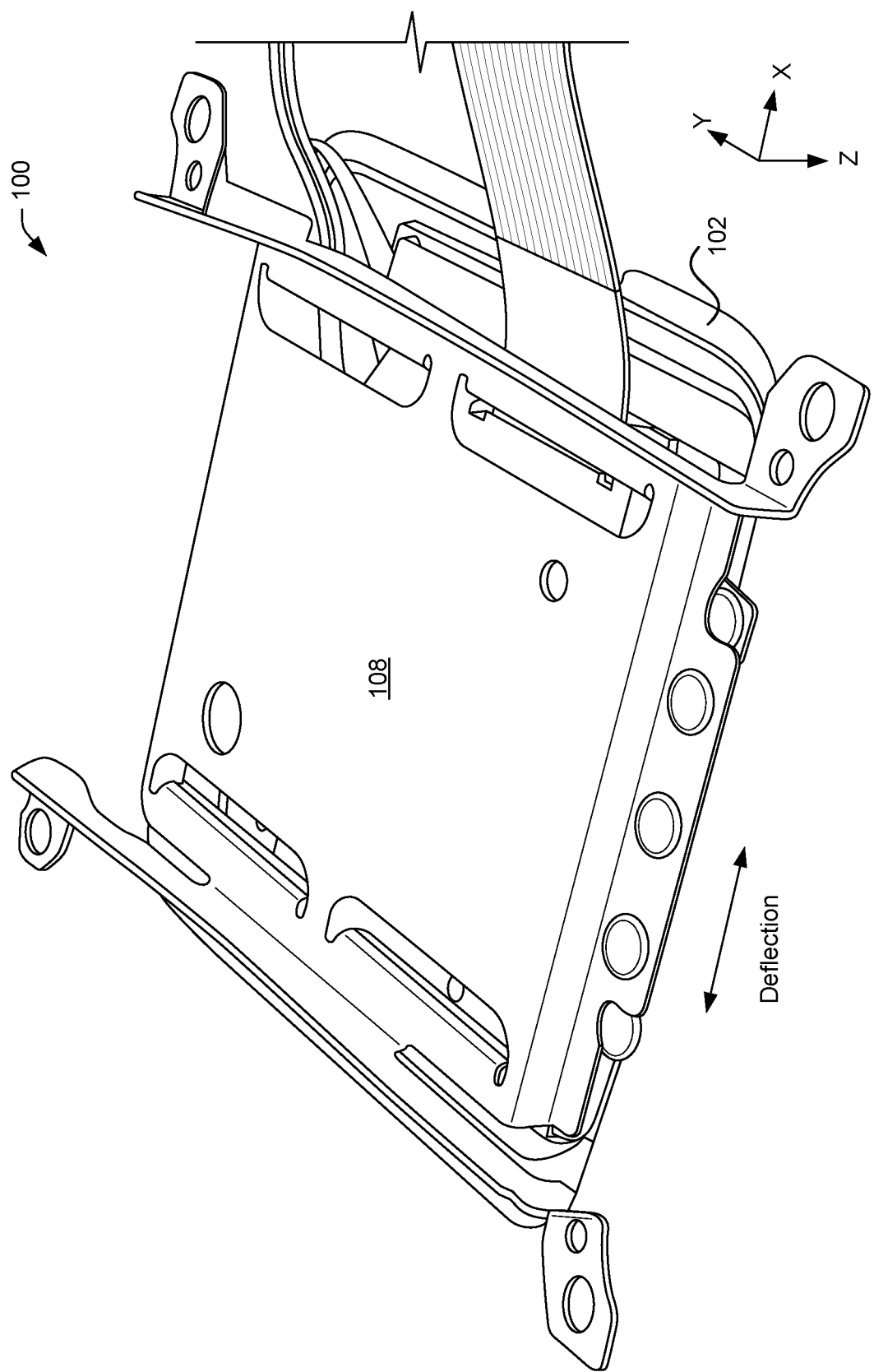
FIG. 1C illustrates another perspective view of the example control of FIG. 1A, the control being shown in the inverted orientation in FIG. 1C.
Figure 1D:
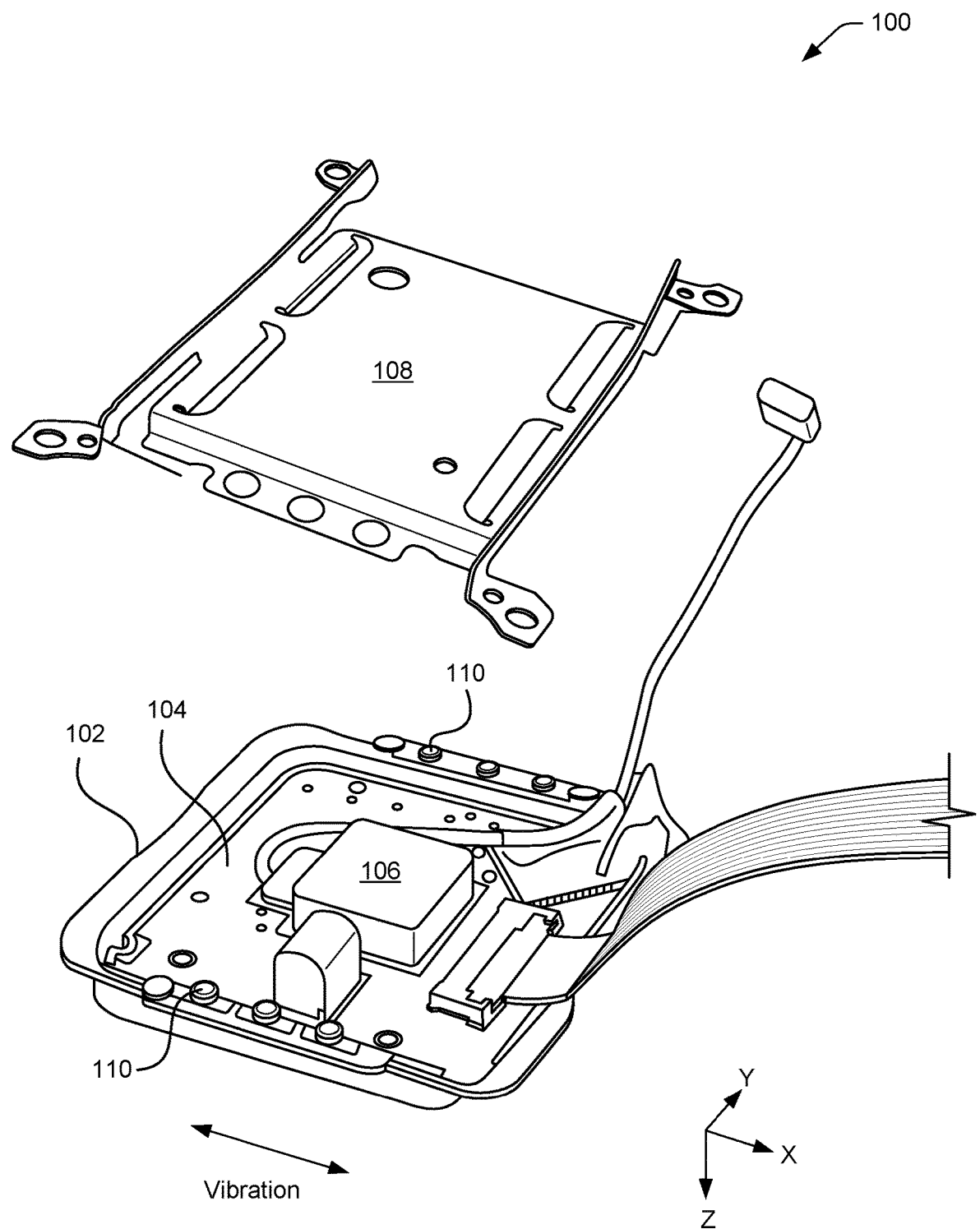
FIG. 1D illustrates a perspective exploded view of the example control of FIG. 1C.
Figure 1F:
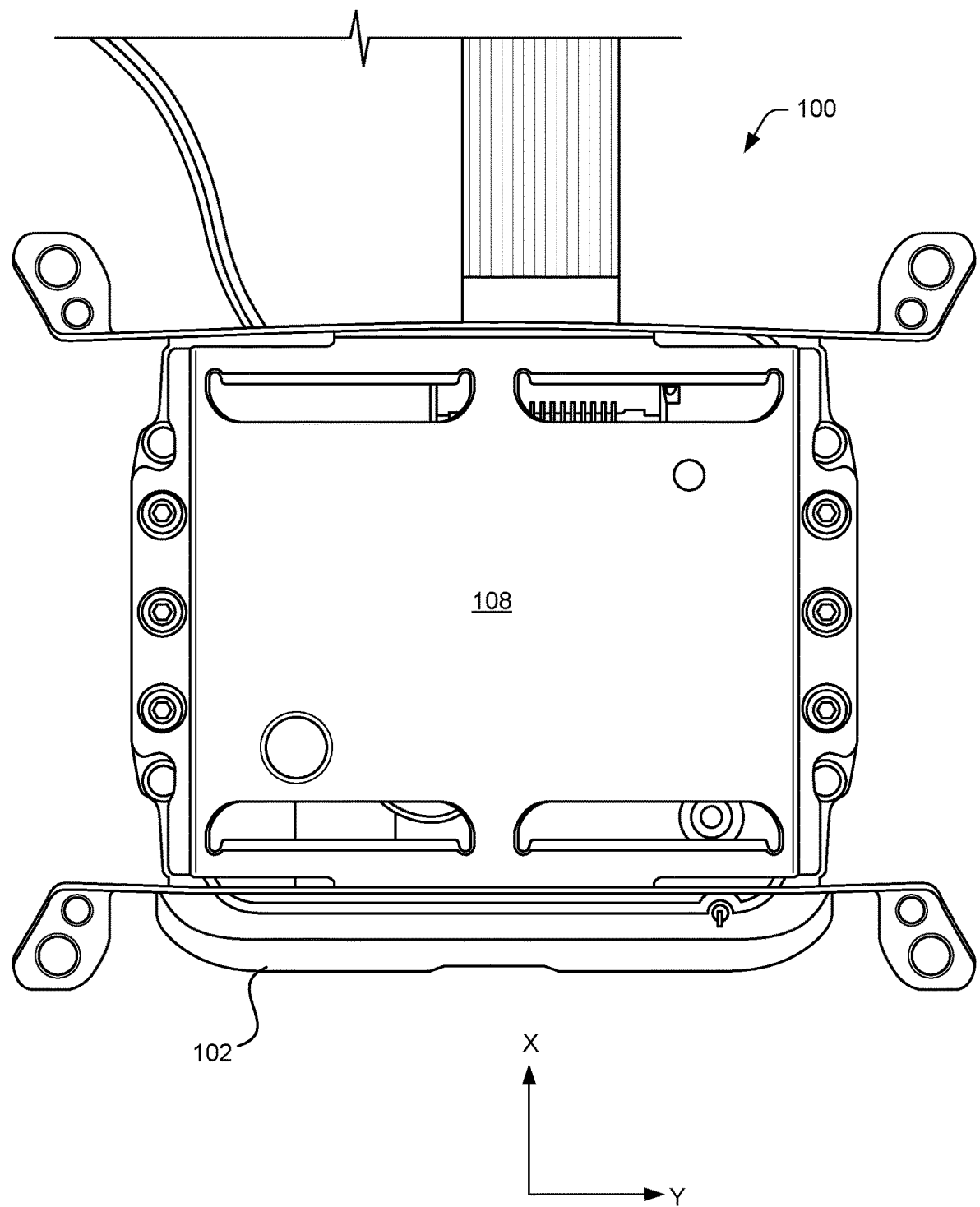
FIG. 1F illustrates a back view of the example control of FIG. 1A.
Figure 1G:
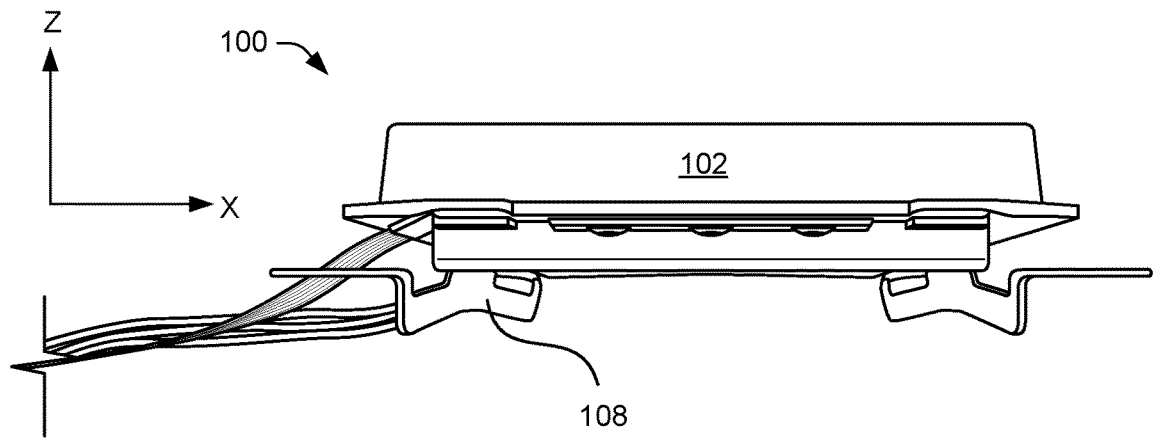
FIG. 1G illustrates a side view of the example control of FIG. 1A.
Figure 1H:
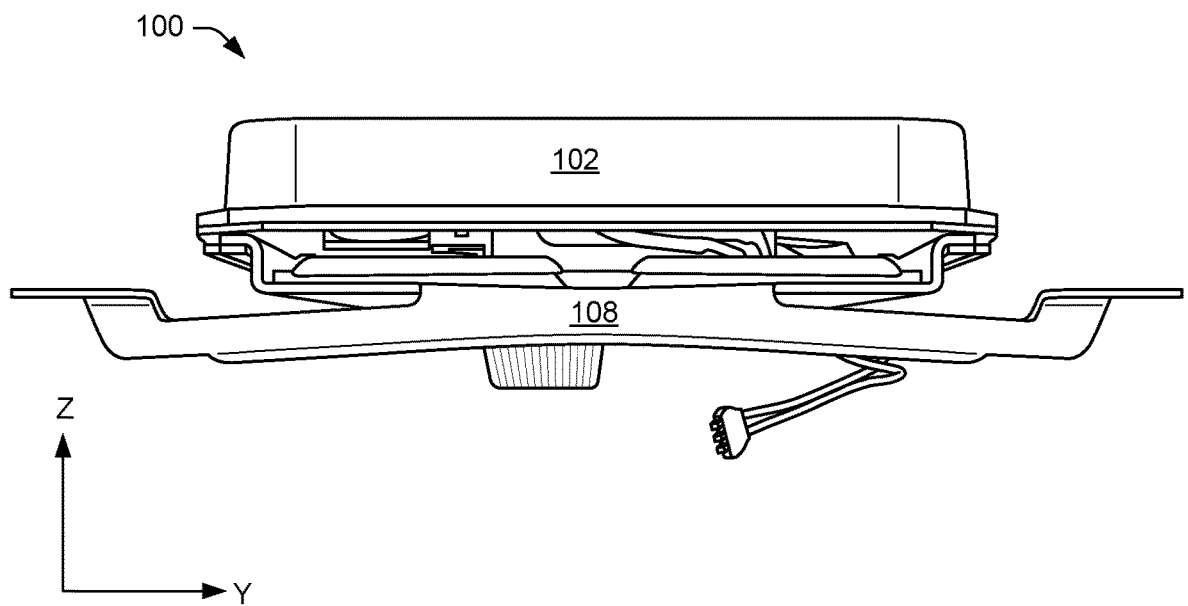
FIG. 1H illustrates another side view of the example control of FIG. 1A.

The control 100 may further include a circuit board 104 (sometimes referred to herein as a "control board" or a "trackpad board"), which is shown in FIG. 1D in the perspective exploded view of the control 100. The circuit board 104 may be disposed behind the cover 102. In general, the control 100 may include a stack, or layers, of components stacked in a stacking direction (e.g., the Z direction). It is to be appreciated that the stacking direction of the control 100 shown in FIGS. 1B-1D is inverted. This is why the positive Z direction is pointing downward in FIGS. 1B-1D. Accordingly, the cover 102 may be disposed in front of the circuit board 104, regardless of the different orientations of the control 100 depicted in FIGS. 1A-1H.

The circuit board 104 may be coupled to the cover 102, such as by an adhesive, by fasteners, or a combination thereof. As used herein, the term "couple" may refer to an indirect coupling or a direct coupling between elements. The term "couple," as used herein, may also refer to a removable coupling or a permanent coupling between the elements. Elements are removably coupled if a user or another entity is able to decouple the elements. Elements are permanently coupled if a user or another entity is unable to decouple the elements without destroying or significantly damaging the elements, or without undue effort to disassemble the elements using tools or machinery. As used herein, the term "couple" can be interpreted as connect, attach, affix, join, engage, interface, link, fasten, or bind. Unless otherwise specified herein, the term "couple" is to be interpreted as coupling elements in a mechanical sense, rather than in an electrical sense, for example. Nevertheless, it is to be appreciated that a mechanical coupling of elements may result in an electrical coupling(s) between multiple elements of a system.

Various components (e.g., electronic components) may be mounted to the circuit board 104. At least one of the components mounted to the circuit board 104 is a haptic actuator 106. Accordingly, the haptic actuator 106 may be disposed behind the cover 102. Said another way, the cover 102 may be disposed in front of the circuit board 104 and also in front of the haptic actuator 106. Although the haptic actuator 106 can be mounted to either side of the circuit board 104, the example implementation shown in FIG. 1D depicts the haptic actuator 106 as being mounted to a back of the circuit board 104. The haptic actuator 106 is configured to provide haptic feedback (e.g., by vibrating, pulsing, etc.). In some examples, the haptic actuator 106 is configured to vibrate in response to a control signal(s) received from a processor(s) of the controller system, which is described in more detail below with reference to FIG. 7. In some examples, the control(s) signal to drive the haptic actuator 106 is provided by the processor(s) in response to one or more criteria being met and/or in response to the occurrence of one or more events. For example, the processor(s) may be configured to process data (e.g., game state data, user input data, etc.) in order to determine if one or more criteria are met, and, if so, send a control signal(s) to the haptic actuator 106 to drive the haptic actuator 106 to provide haptic feedback. The control signal(s) may specify a gain and/or a frequency at which to drive the haptic actuator 106, and the haptic actuator 106 may be configured to vibrate in response to the control signal(s) from the processor(s) such that the user can feel a tactile, vibration of the cover 102. The haptic actuator 106 may be any suitable type of haptic actuator including, without limitation, a LRA, an eccentric rotating mass (ERM), or the like. The haptic actuator 106 may be controlled to vibrate or resonate in any suitable direction(s). In the example of FIG. 1D, the direction of vibration is shown as the X direction. For example, when the control 100 is implemented on the front surface 602 of the controller 600, as shown in FIG. 6, the haptic actuator 106 may vibrate bidirectionally in the X direction (e.g., side-to-side, from the perspective of the user holding the controller 600). In some examples, the haptic actuator 106 is configured to vibrate in multiple different directions, such as in the X, Y, and/or Z directions, as depicted in the figures.

The control 100 may further include a spring 108 (sometimes referred to herein as a "biasing member" or a "suspension mechanism"). The spring 108 is disposed behind the cover 102, and the spring 108 is coupled to the cover 102.

Figure 4A:
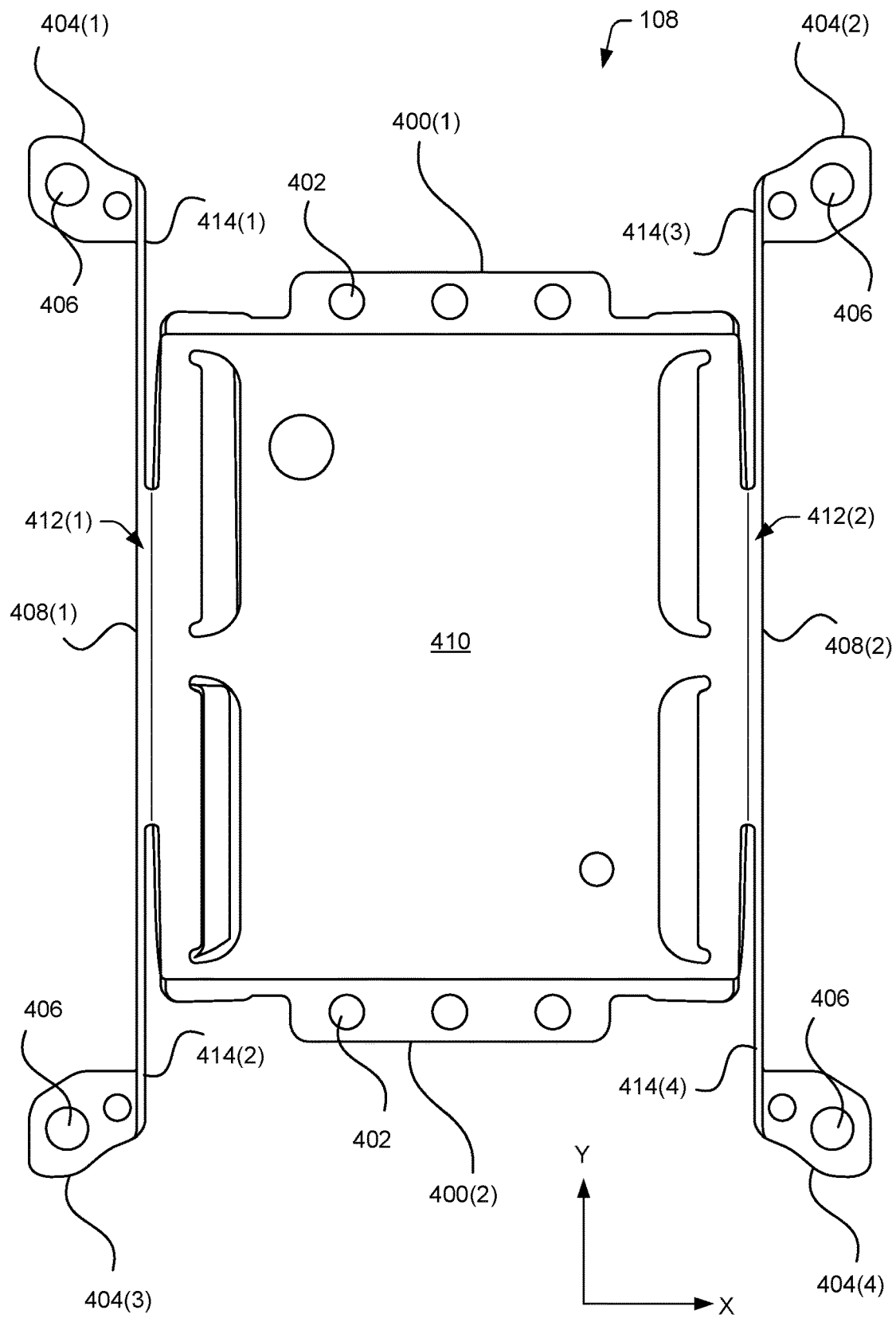
FIG. 4A illustrates a back view of an example spring of the control of FIG. 1A.
Figure 4B:
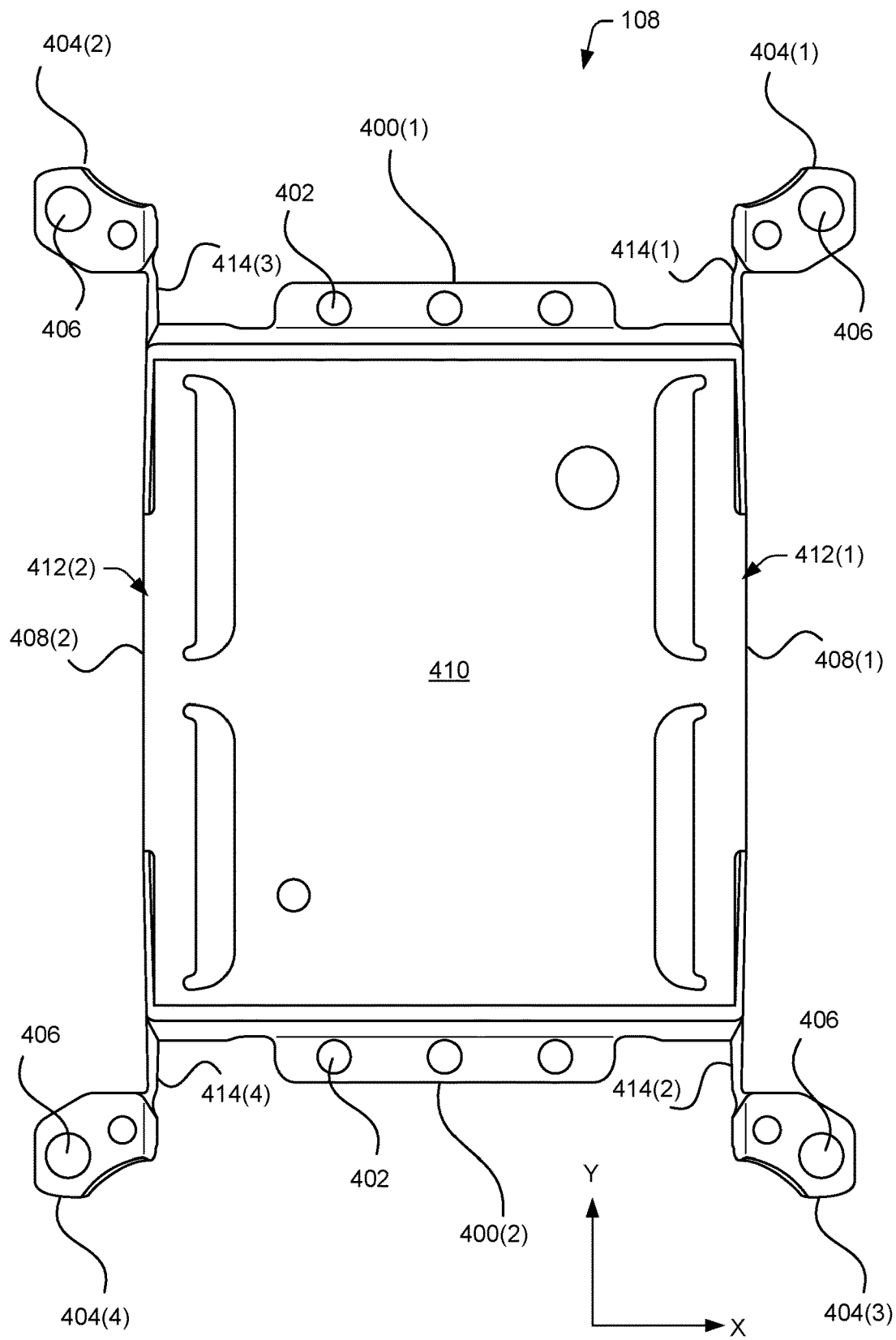
FIG. 4B illustrates a front view of the example spring of FIG. 4A.
Figure 4C:
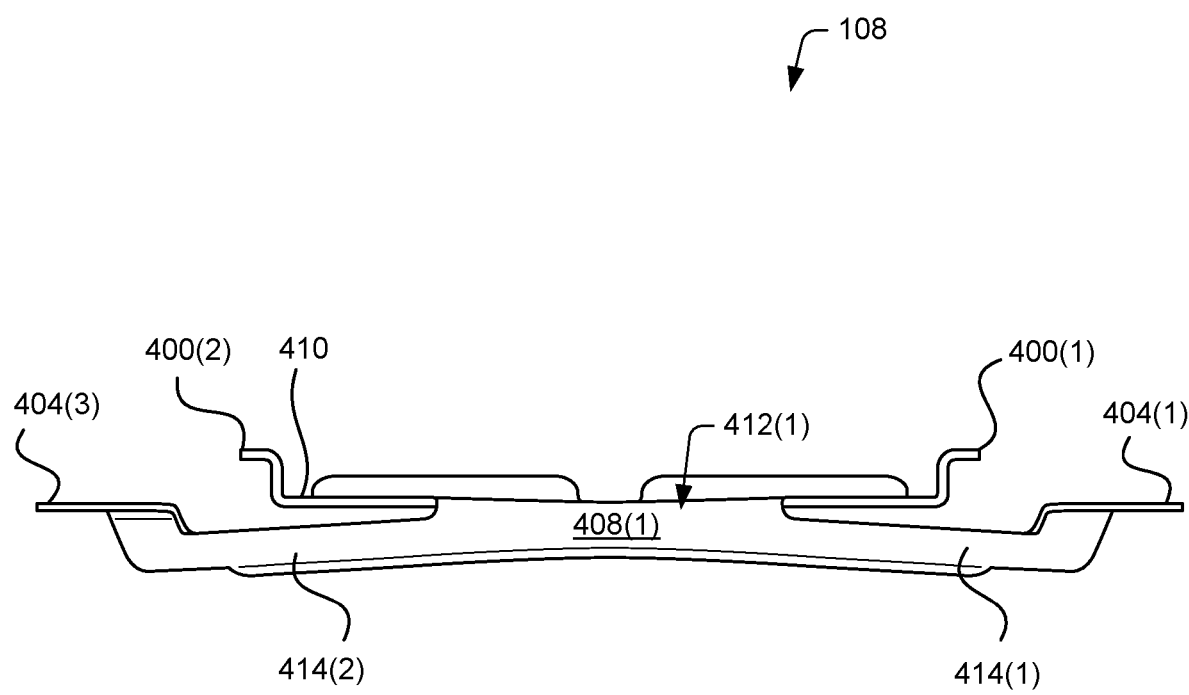
FIG. 4C illustrates a side view of the example spring of FIG. 4A.

Reference is made to FIGS. 4A-4C to discuss details of the example spring 108 shown in the figures. As depicted in FIGS. 4A and 4B, the spring 108 may include one or more (e.g., a pair of) side flanges 400, such as a first side flange 400(1) and a second side flange 400(2), which are used to couple the spring 108 to the cover 102. For instance, the first side flange 400(1) may include one or more (e.g., three) holes 402, and the second side flange 400(2) may include one or more (e.g., three) holes 402. These holes 402 may be configured to receive one or more corresponding projections 110 (See FIG. 1D) extending from a back of the cover 102. In the example of FIGS. 1A-1H, these projections 110 extend from the back of the cover 102 at opposing sides 112 of the cover 102. For example, FIGS. 1B-1D, 1F, and 1G depict three projections 110 disposed at one side 112(1) of the cover 102 and three other projections 110 disposed at the opposing side 112(2) of the cover 102). Accordingly, the first side flange 400(1) of the spring 108 may be coupled to a back of the cover 102 at a first side 112(1) of the cover 102, and the second side flange 400(2) of the spring 108 may be coupled to the back of the cover 102 at a second side 112(2) of the cover 102 opposite the first side 112(1) of the cover 102. In some examples, adhesive is used to permanently couple the spring 108 to the cover 102 and/or to ensure that the spring 108 does not detach from the cover 102 unexpectedly during use of the controller 600 in which the control 100 is disposed.

The spring 108 is also mounted to a housing 500 (sometimes referred to herein as a "frame" or "controller body") of the controller 600, as illustrated in FIGS. 5A and 5B. In some examples, the spring 108 is mounted to the housing 500 via one or more (e.g., a plurality of) flanges 404. The example spring 108 depicted in FIGS. 4A-4C includes four flanges 404(1), 404(2), 404(3), and 404(4) at the corners of the spring 108, which is depicted as having a generally rectangular shape. Hence, these flanges 404 are sometimes referred to herein as "corner flanges." As shown in FIGS. 4A and 4B, the corner flanges 404 may each include a hole 406 that is configured to receive a corresponding projection extending from an inner surface of the housing 500. In some examples, adhesive is used to permanently mount the spring 108 to the housing 500 of the controller 600 and/or to ensure that the spring 108 does not detach from the housing 500 unexpectedly during use of the controller 600 in which the control 100 is disposed.

The spring 108 is made of a compliant material, such as metal (e.g., spring steel). In some examples, the spring 108 is manufactured from a single piece of material (e.g., a single piece of spring steel), which can be cut (e.g., machined) and shaped into the form depicted in the figures. In other words, the spring 108 may be implemented as a monolithic spring made of metal (e.g., spring steel).

The spring 108 further includes one or more (e.g., a pair of) elongate spring arms 408 (sometimes referred to herein as "spring bars," or "spring blades"), such as a first elongate spring arm 408(1) and a second elongate spring arm 408(2). The spring 108 may further include a body 410, which may have various features (e.g., apertures, holes, fins, projections, etc.). In some examples, the features of the body 410 of the spring 108 are to allow air to flow through a space between the spring 108 and the circuit board 104, which can help cool electronic components mounted to the circuit board 104 through convection. In some examples, the body 410 of the spring 108 is rectangular in shape, although other shapes are possible for the body 410, and the shape of the body 410 may depend on the type of control 100 in which the spring 108 is implemented. For example, if the spring 108 is included in a D-pad, the body 410 of the spring 108 may have a cross shape, similar to the cross shape of a four-way D-pad.

As shown in FIGS. 4A-4C, the first elongate spring arm 408(1) adjoins the body 410 of the spring 108 at a first neck region 412(1). Similarly, the second elongate spring arm 408(2) adjoins the body 410 of the spring 108 at a second neck region 412(2), as shown in FIGS. 4A and 4B. In some examples, as shown in FIG. 4C, the elongate spring arms 408 project downward (e.g., in the negative Z direction) from the body 410 of the spring 108. In some examples, the side flanges 400 run along opposing sides of the body 410 while the elongate spring arms 408 run alongside the other opposing sides of the body 410. Accordingly, when the spring 108 is coupled to the cover 102, the elongate spring arms 408 are adjacent (and in some cases parallel) to opposing sides 112 of the cover 102. For example, when the spring 108 is coupled to the cover 102, the second elongate spring arm 408(2) may be adjacent (and parallel) to a third side 112(3) of the cover 102, and the first elongate spring arm 408(1) may be adjacent (and parallel) to a fourth side 112(4) of the cover 102. "Adjacent," as used in this context can mean "closer to". Accordingly, when the spring 108 is coupled to the cover 102, the second elongate spring arm 408(2) may be closer to a third side 112(3) of the cover 102 than to a fourth side 112(4) of the cover 102 opposite the third side 112(3), and the first elongate spring arm 408(1) may be closer to a fourth side 112(4) of the cover 102 than to a third side 112(3) of the cover 102 opposite the fourth side 112(4).

As illustrated in FIG. 4C, the elongate spring arms 408 are longer than the lengths of the neck regions 412 (e.g., in the Y direction). In some examples, the first neck region 412(1) and the second neck region 412(2) are substantially equal in length, the length (of each neck region 412) being within a range of about 5 millimeters (mm) to 20 mm. Because the elongate spring arms 408 are longer than the lengths of the neck regions 412, each elongate spring arm 408 includes a pair of cantilevers 414. Each cantilever 414 is fixed at one end of the cantilever 414 to the body 410 at the neck region 412, and the cantilever 414 extends away from the neck region 412. The pair of cantilevers 414 of a given elongate spring arm 408 extend in opposite directions. For example, the first elongate spring arm 408(1) may include a first cantilever 414(1) extending from the first neck region 412(1) in a first direction (e.g., the positive Y direction), and a second cantilever 414(2) extending from the first neck region 412(1) in a second direction (e.g., the negative Y direction) opposite the first direction. Similarly, the second elongate spring arm 408(2) may include a third cantilever 414(3) extending from the second neck region 412(2) in the first direction (e.g., the positive Y direction), and a fourth cantilever 414(4) extending from the second neck region 412(2) in the second direction (e.g., the negative Y direction). These cantilevers 414 are configured to flex or bend at least bidirectionally and to move relative to the body 410 of the spring 108. This ability of the cantilevers 414 to flex or bend allows the spring 108 to deflect at least bidirectionally in response to a vibration of the haptic actuator 106 when the spring 108 is mounted to the housing 500 of the controller 600. In some examples, when the haptic actuator 106 vibrates, the vibration is transferred to the circuit board 104 on which the haptic actuator 106 is mounted, which causes the cover 102 to vibrate (because the circuit board 104 is coupled to the cover 102), and this vibration of the cover 102 causes the spring 108 to deflect back and forth (e.g., in the X direction, as depicted in FIGS. 1A-1C), because the spring 108 is coupled to the cover 102. This deflection of the spring 108 is allowed by the flexion of the cantilevers 414 of the elongate spring arms 408. In some examples, the lengths of the neck regions 412 and/or the lengths of the cantilevers 414 (e.g., in the Y direction) is partly what defines the spring constant, K, of the spring 108. For instance, the longer the neck regions 412 and/or the shorter the cantilevers 414 (e.g., in the Y direction), the stiffer the spring 108, and the shorter the neck regions 412 and/or the longer the cantilevers 414, the more flexible the spring 108. The material of the spring 108 and the thickness of at least the cantilevers 414 also plays a role in the spring constant, K, of the spring 108. In any case, the spring constant, K, along with the mass of the entire control 100 (e.g., the mass of the cover 102, the mass of the circuit board 104, and the mass of one or more components, including the haptic actuator 106, mounted to the circuit board 104, defines the resonant frequency of the control 100.

The haptic actuator 106 itself may have a first resonant frequency (also known as a "natural resonant frequency"). For example, if the haptic actuator 106 is implemented as a single-resonance LRA, which includes a magnet attached to a spring, the resonant frequency of the LRA is defined by the spring constant, K. (or stiffness) of the spring inside of the LRA, as well as the mass of the magnet inside of the LRA. A typical resonant frequency of a single-resonance LRA is within a range of about 175 Hertz (Hz) to 235 Hz. The resonant frequency of the haptic actuator 106 is the frequency at which the haptic actuator 106 is most efficient in its operation, meaning that the acceleration output is maximized for a certain amount of input energy to drive the haptic actuator 106.

When the control 100 is mounted to the housing 500 of the controller 600 via the spring 108, as depicted in FIGS. 5A and 5B, the control 100 is suspended within the housing 500 by the spring 108, and, because the spring 108 is configured to deflect bidirectionally in response to a vibration of the haptic actuator 106, the control 100 has its own resonant frequency (a second resonant frequency). In particular, the example control 100 has a second resonant frequency that is different than the first resonant frequency of the haptic actuator 106. This second resonant frequency of the control 100 can be tuned by manufacturing the components of the control 100 to have particular masses, and/or by manufacturing the spring 108 to have a particular spring constant, K, (or stiffness). In other words, the second resonant frequency of the control 100 is defined by a spring constant, K. (or stiffness) of the spring 108, a mass of the cover 102, a mass of the circuit board 104, and a mass of one or more components, including the haptic actuator 106, mounted to the circuit board 104. If other components, such as sensors (e.g., a touch sensor layer, such as a capacitive touch sensing layer), are included in the control 100, the mass(es) of those components also affects the second resonant frequency of the control 100. For example, a touch sensor layer (e.g., a capacitive sensor array) may be disposed between the cover 102 and the circuit board 104, the touch sensor having its own mass that affects the second resonant frequency of the control 100. Similarly, if a pressure sensor is included in the control 100, the mass of the pressure sensor is factored into the second resonant frequency. As such, one can tune the masses of any of these components and/or the spring constant, K, of the spring 108 to achieve a desired second resonant frequency of the control 100 that is different from the first resonant frequency of the haptic actuator 106 itself. By tuning these resonant frequencies to be different, a broadband haptic system is created, which combines the single resonance of a potentially inexpensive, single-resonance haptic actuator 106 (e.g., a LRA with a single resonant frequency) with the different resonance (e.g., self-resonance) of the spring-mounted control 100 (e.g., trackpad) to widen the working frequency band of the haptic system.

In some examples, a difference between the first resonant frequency of the haptic actuator 106 and the second resonant frequency of the spring-mounted control 100 is within a range of about 70 Hz to 160 Hz. The difference between the first and second resonant frequencies may be such that the second resonant frequency of the control 100 couples, and combines, with the first resonant frequency of the haptic actuator 106, and such that the separation between these resonant frequencies broadens the overall spectrum (or working frequency band) of the haptic system. By contrast, if these resonant frequencies are tuned to be the same resonant frequency, the working frequency band of the haptic system would not be widened (i.e., the working frequency band would be narrower than it is capable of being), and the equivalent resonant frequencies may reinforce each other to cause an unwanted "rattling" of the control 100 within the housing 500 whenever the haptic actuator 106 is driven. To eliminate such unwanted rattling, the second resonant frequency of the control 100 can be de-tuned with respect to the first resonant frequency of the haptic actuator 106. Furthermore, by tuning the spring constant, K, of the spring 108 and/or by tuning the masses of the components of the control 100 (e.g., the mass of the cover 102, the mass of the circuit board 104, the mass of the haptic actuator 106 and/or the mass(es) of one or more other components of the control 100, etc.), these resonant frequencies can differ from each other to a degree where the working frequency band of the haptic system is broadened, thereby creating a broadband haptic system that is capable of providing a wider variety of types of haptic feedback. In some examples, the second resonant frequency of the control 100 is "sufficiently different" from the first resonant frequency of the haptic actuator 106 if the first and second frequencies differ by at least about 70 Hz. Thus, the overall resonance of the haptic system disclosed herein has a significantly wider bandwidth, as compared to the bandwidth that would be created if the resonant frequencies were the same.

Figure 2:
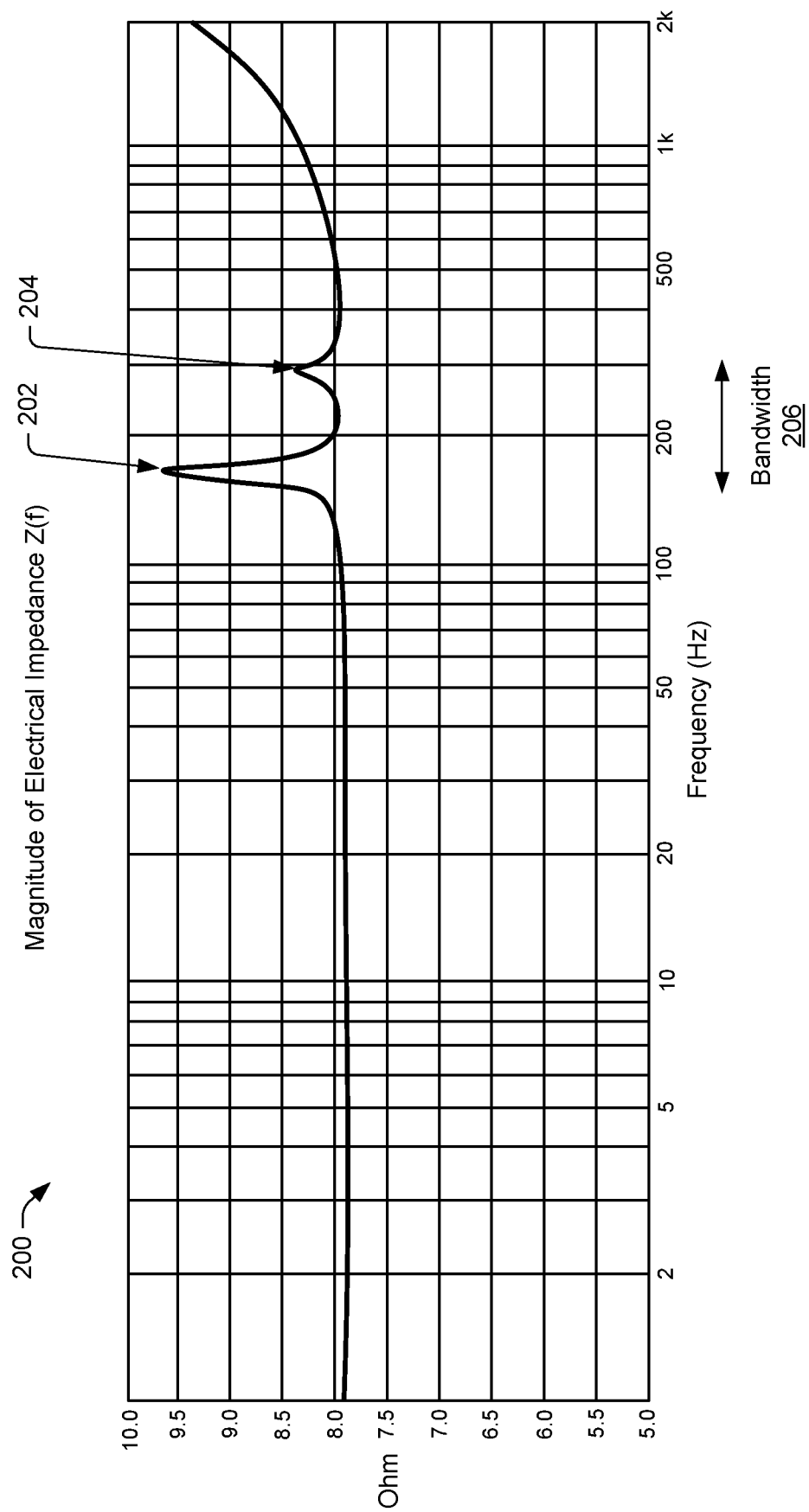
FIG. 2 illustrates a Bode plot of the impedance magnitude of the example control of FIG. 1A, the impedance magnitude being a proxy for vibrational acceleration of the control during actuation of the haptic actuator of the control.

FIG. 2 illustrates a Bode plot 200 of the impedance magnitude of the example control 100 of FIG. 1A. The impedance magnitude is a suitable proxy for vibrational acceleration (haptic response) of the control 100 during actuation of the haptic actuator 106 of the control 100. As shown in the Bode plot 200, a first peak 202 in the impedance magnitude occurs at a first frequency of approximately 180 Hz, and a second peak 204 in the impedance magnitude occurs at a second frequency of approximately 300 Hz. In the example Bode plot 200, the second peak 204 is reduced relative to the first peak 202 by approximately 9%, which is considered to be an insignificant reduction in impedance magnitude. These peaks 202, 204 are indicative of the different resonant frequencies of the broadband haptic system disclosed herein. That is, the first peak 202 may be indicative of the first resonant frequency of the haptic actuator 106, and the second peak 204 may be indicative of the second resonant frequency of the control 100. The combination of the two different resonant frequencies results in the overall haptic system having a bandwidth 206 that is broader than its narrow band counterparts.

Figure 3:
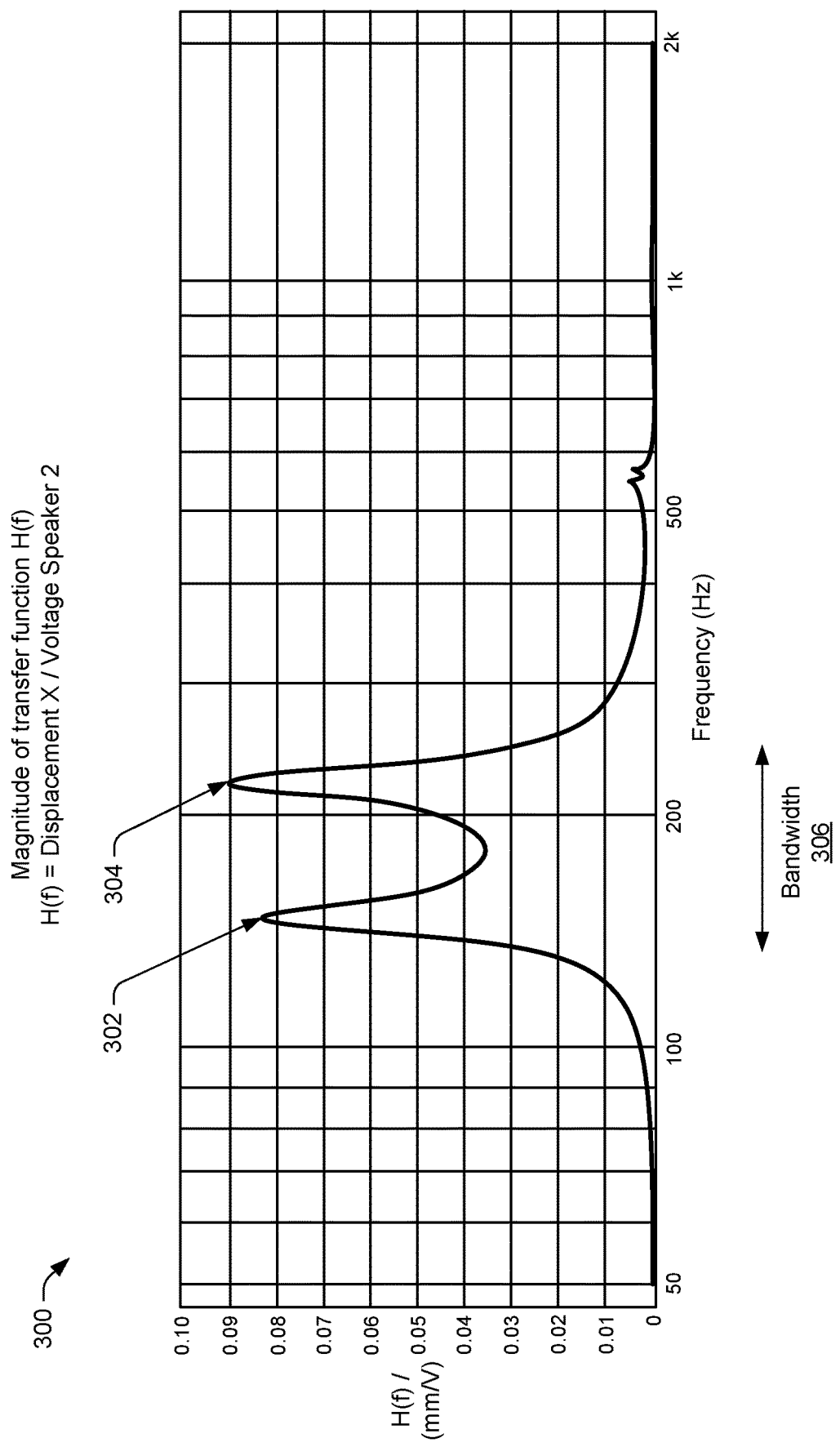
FIG. 3 illustrates a Bode plot of the excursion of the example control of FIG. 1A, the excursion being another proxy for vibrational acceleration of the control during actuation of the haptic actuator of the control.

FIG. 3 illustrates a similar broadband effect of the disclosed haptic system. FIG. 3 illustrates a Bode plot 300 of the excursion of the example control 100 of FIG. 1A. The "excursion" that is plotted in FIG. 3 represents the measured displacement of the control 100 (e.g., in the X direction) during actuation of the haptic actuator 106 of the control 100, the excursion being another suitable proxy for vibrational acceleration (haptic response) of the control 100 during actuation of the haptic actuator 106 of the control 100. As shown in the Bode plot 300, a first peak 302 in the excursion occurs at a first frequency of approximately 160 Hz, and a second peak 304 in the excursion occurs at a second frequency of approximately 230 Hz. These peaks 302, 304 are indicative of the different resonant frequencies of the broadband haptic system disclosed herein. That is, the first peak 302 may be indicative of the first resonant frequency of the haptic actuator 106, and the second peak 304 may be indicative of the second resonant frequency of the control 100. In the Bode plot 300, the second peak 304 is more pronounced than the second peak 204 in the Bode plot 200 of FIG. 2, and intermediate excursion values between the peaks 302 and 304 in the Bode plot 300 are more pronounced, as compared to the intermediate impedance magnitude values between the peaks 202 and 204 of the Bode plot 200. Regardless, both Bode plots 200, 300 illustrate the broadband response created with the disclosed haptic system, although the effect is perhaps more pronounced in the Bode plot 300. In FIG. 3, the combination of the two different resonant frequencies results in the overall haptic system having a bandwidth 306 that is broader than its narrow band counterparts.

FIG. 5A illustrates a back view of an example controller (e.g., the controller 600 shown in FIG. 6) with a back panel of the controller housing 500 removed in order to show example controls 100(1) and 100(2) mounted to the housing 500. FIG. 5B illustrates a zoomed-in view of the control 100(1) shown in FIG. 5A. Each of the controls 100(1), 100(2) may represent the control 100 introduced in FIGS. 1A-1H. As shown in FIGS. 5A and 5B, a spring 108 of each control 100(1), 100(2) is mounted to the housing 500 in respective positions (e.g., on opposite sides of the centrally-located display 610 of the controller 600). As discussed above, the spring 108 of each control 100(1), 100(2) is coupled to the cover 102 of each control 100(1), 100(2). Accordingly, these controls 100(1), 100(2) are spring-mounted, and they are suspended within the housing 500 by their respective springs 108. The spring 108 of each control 100(1), 100(2) is mounted to the housing 500 via the corner flanges 404 of the spring 108, which are positioned at the distal ends of elongate spring arms 408. That is, as shown in FIGS. 4A and 4B, the first elongate spring arm 408(1) may include a first corner flange 404(1) at a first end of the first elongate spring arm 408(1), and a second corner flange 404(3) at a second end of the first elongate spring arm 408(1), and the second elongate spring arm 408(2) may include a third corner flange 404(2) at a first end of the second elongate spring arm 408(2), and a fourth corner flange 404(4) at a second end of the second elongate spring arm 408(2). In some examples, the corner flanges 404 may be mounted to projections extending from an inner surface of the housing 500. In this manner, the spring 108 is anchored to the housing 500, and the spring 108 biases the cover 102 (and, hence, the control 100) in the forward direction (e.g., positive Z direction) towards the user when the user is properly holding the controller 600. In some examples, a portion of the cover 102 (e.g., a lip around a periphery of the cover 102) may be biased by the spring 108 against an inner surface of the housing 500 and within an opening in the housing 500 so that the user can access (e.g., touch, press upon, etc.) the control 100 externally without the control 100 being "pushed" out of the housing 500. In other words, a lip around the periphery of the cover 102 may retain the control 100 within the housing 500 due to a corresponding opening in the housing 500 being slightly smaller than the area of the cover 102, including the peripheral lip of the cover 102.

The spring 108 may be configured to deflect and/or deform in response to an object (e.g., a finger) pressing on the cover 102, and to return to an original form and/or position when the pressure on the cover 102 ceases (e.g., when the finger is removed from, or stops applying pressure upon, the cover 102). In other words, the spring 108 may be configured to apply a biasing force on the cover 102 in an opposite direction to that of a force of a press on the cover 102 by a user of the control 100 and/or the controller 600. In some examples, the spring 108 applies a forward biasing force (e.g., a biasing force in the positive Z direction) on the cover 102 from opposing sides 112(1), 112(2) of the cover 102 to provide a balanced, forward biasing force on the cover 102 (and, hence, the control 100). In some examples, the spring 108 may have an anisotropic characteristic that optimizes the forces of the spring 108 on the cover 102 in orthogonal directions. For example, the biasing force in the positive Z direction can be optimized for a press on the cover 102, and the biasing force in the X direction (and/or the Y-direction) is optimized for the vibration of the haptic actuator 106. Again, a vibration of the haptic actuator 106 causes the circuit board 104 to vibrate, which, in turn, causes the cover 102 to vibrate, which, in turn, causes bidirectional deflection of the spring 108 to provide haptic feedback. The cover 102 is therefore biased in an forward (e.g., positive Z) direction against an inner surface of the housing 500 so that a user can press on the control 100 (e.g., trackpad) and the spring 108 will allow for some amount of deflection in the backward (e.g., negative Z) direction, while the spring 108 (and in particular the spring arms 408) further allow the control 100 to vibrate transversely, or in plane with a surface (e.g., a front surface 602) of the controller housing 500 (e.g., in the X direction).

In the examples described herein, the haptic actuator 106 is configured to vibrate transversely (e.g., in the X direction). When the spring 108 of each control 100 is mounted to the housing 500, the elongate spring arms 408, and in particular the cantilevers 414 thereof, allow the spring 108 to deflect bidirectionally as the suspended control 100 moves back-and-forth transversely (e.g., in the X direction) along the same vibrational axis of the haptic actuator 106 (See FIG. 1D). As noted above, the mass the cover 102, the mass of the circuit board 104, and the mass(es) of the component(s) (e.g., the mass of the haptic actuator 106) mounted to the circuit board 104 constitute the total mass of the control 100. This total mass, combined with the compliance (or stiffness) of the spring 108 (e.g., the combined compliance of the elongate spring arms 408) forms a resonant system, which is referred to herein as the resonant frequency of the control 100. By tuning the compliance of the spring 108 and the total mass of the control 100 assembly, the resonant frequency of the control 100 can be tuned to be different than the resonant frequency of the haptic actuator 106 itself, as indicated in the Bode plots 200, 300 of FIGS. 2 and 3, respectively. This creates a broadband haptic system (sometimes referred to herein as a "broadband coupled resonant system").

The disclosed broadband haptic system is more performant than its narrow band counterparts, and it can provide a broadband haptic response at a fraction of the cost of other systems that promise similar versatility in haptic responses, albeit with more complex, expensive haptic actuators. The broadband haptic response of the disclosed haptic system is effected by the widened working frequency band (e.g., the bandwidths 206, 306 shown in FIGS. 2 and 3, respectively) of the haptic system. IN other words, the haptic actuator 106 (with its own resonant frequency) is coupled, and combined, with a suspended control 100(with its own, but different resonant frequency). In some examples, this relatively wide bandwidth can allow for producing more complex haptic signals (e.g., square waves) in the haptic response. Accordingly, haptic feedback can be provided as an extremely tight "tick", instead of being limited to one type of haptic response (e.g., a longer, rumble-type vibration). Accordingly, the disclosed broadband haptic system can provide a haptics engineer with more creative freedom to create a variety of types of haptic feedback responses.

FIG. 6 illustrates a front view of an example controller 600 with example controls 100(1) and 100(2) for operation by fingers of a user of the controller 600. As mentioned above with respect to FIGS. 5A and 5B, each of the controls 100(1), 100(2) may represent the control 100 introduced in FIGS. 1A-1H. In accordance with various embodiments described herein, the terms "device," "handheld device," "handheld game device," "handheld console," "handheld game console," "controller," and "handheld controller" may be used interchangeably herein to describe any device like the controller 600 in which the control(s) 100 can be implemented.

The housing 500 of the controller 600 may have various surfaces including a front surface 602 (or front), as well as a back surface (or back), a top surface (or top edge, or top), a bottom surface (or bottom edge, or bottom), a left surface (or left edge, or left), and a right surface (or right edge, or right). Accordingly, the housing 500 may be a cuboid. The front surface 602 and the back surface (not shown in FIG. 6) may be relatively large surfaces compared to the top, bottom, left, and right surfaces of the housing 500.

As illustrated in FIG. 6, the front surface 602 of the housing 500 may include a plurality of controls configured to receive input of the user. Touch data generated by the controls may be used to detect a presence, location, and/or gesture of a finger of a user operating the controller 600. In some instances, the front surface 602 of the housing 500 may include one or more front-surface controls that are, in some instances, controllable by one or more thumbs of the user operating the controller 600. The handheld controller 600 may further include one or more top-surface controls residing on a top surface (or top edge) of the housing 500. Additionally, or alternatively, the handheld controller 600 may include one or more back-surface controls residing on the back surface of the housing 500 and operable by fingers of a left hand and/or a right hand of the user. Additionally, or alternatively, the handheld controller 600 may include one or more left-surface controls and/or right-surface controls residing on respective left and right surfaces of the housing 500.

The controls 100(1) and 100(2) are shown as exemplary front-surface controls in the form of trackpads. The front-surface controls may further include one or more trackballs, joysticks, buttons, D-pads, or the like. For example, in addition to the left control 100(1) (e.g., left trackpad), the front surface 602 may include a left joystick 604(1), and/or a left D-pad 606 controllable by a left thumb of the user. In some embodiments, the front surface 602 may include additional left buttons controllable by the left thumb. The front surface 602 may, in addition to the right control 100(2)

(e.g., right trackpad), also include a right joystick 604(1), and/or one or more right buttons 608 (e.g., X, Y, A, and B buttons) controllable by a right thumb of the user. In some embodiments, the front surface 602 may include additional right buttons controllable by the right thumb. In some examples, the front surface 602 may include other controls, such as tilting button(s), trigger(s), knob(s), wheel(s), paddles, panels, and/or wings, and the plurality of controls may be configured to receive input from any combination of thumbs and/or fingers of the user.

In some embodiments, the controls 100(1), 100(2) are each implemented as quadrilateral-shaped trackpads. For example, the controls 100(1), 100(2) may be implemented as generally square-shaped trackpads. Furthermore, the quadrilateral-shaped controls 100(1), 100(2) may have rounded corners. Additionally, as shown in FIG. 6, a straight side edge of each control 100(1), 100(2) is aligned with (e.g., parallel to) the side (e.g., left and right) edges of a display 610 in a center of the housing 500 on the front surface 602 of the housing 500. As compared to circular trackpads, the quadrilateral-shaped controls 100(1), 100(2) (e.g., trackpads) provide extra space at the corners that can be accessed by a finger (e.g., a thumb) of a user. Accordingly, the quadrilateral-shaped controls 100(1), 100(2) (e.g., trackpads) may be more ergonomic than circular trackpads due to the extra area provided by the controls 100(1), 100(2) (e.g., trackpads). For example, the quadrilateral shape of the controls 100(1), 100(2) (e.g., trackpads) may give a user the ability to reorient his/her hands on the controller 600 and still access the controls 100(1), 100(2) (e.g., trackpads) with his/her thumbs. Additionally, or alternatively, a user may choose to grip the controller 600 in a slightly different way so that the corners of a control 100 (e.g., trackpad) are used like the North, South, East, and West parts of the trackpad (e.g., like a diamond-shaped trackpad).

The housing 500 may further includes a left handle 612(1) and a right handle 612(2) by which the user may hold the controller 600 via right and left hands of the user, respectively. Holding the left handle 612(1) in the left hand may provide access to the left controls (e.g., the left control 100(1)), and holding the right handle 612(2) in the right hand may provide access to the right controls (e.g., the right control 100(2)).

The top of the housing 500 may include one or more controls, such as a left trigger(s), bumper(s), buttons, etc. and/or a right trigger(s), bumper(s), buttons, etc., These top-surface controls may be controlled by index fingers of the user during normal operation while the controller 600 is held by the user. In some examples, the top of the housing 500 may include a wired communication interface(s) (e.g., a port, plug, jack, etc.) and/or a power port for coupling the controller 600 to external devices (e.g., charger, game console, display, computing device, etc.). A back of the housing 500 may include controls conveniently manipulated by the index or middle fingers of the user. In some instances, the back of the housing 500 may include portions that are depressible to control one or more underlying buttons within the controller 600.

The handheld controller 600 may allow for different arrangements or functionalities to modify the configuration of the controller to meet the needs of different applications (e.g., game titles), users, and the like. For example, a user may select which controls to use depending on the gaming application currently executing. Thus, the user may configure the handheld controller 600 to be operated with certain controls depending on certain needs and/or preferences. In some instances, the handheld controller 600 may be dynamically configured depending on which user is currently operating the handheld controller. Furthermore, in some instances, the handheld controller 600 or a remote system may determine the configuration of the handheld controller 600 and which controls are currently being operated, or capable of being operated. This information may be provided to a system executing the current application, which in turn, may make modifications based on the configuration of the handheld controller.

Figure 7:
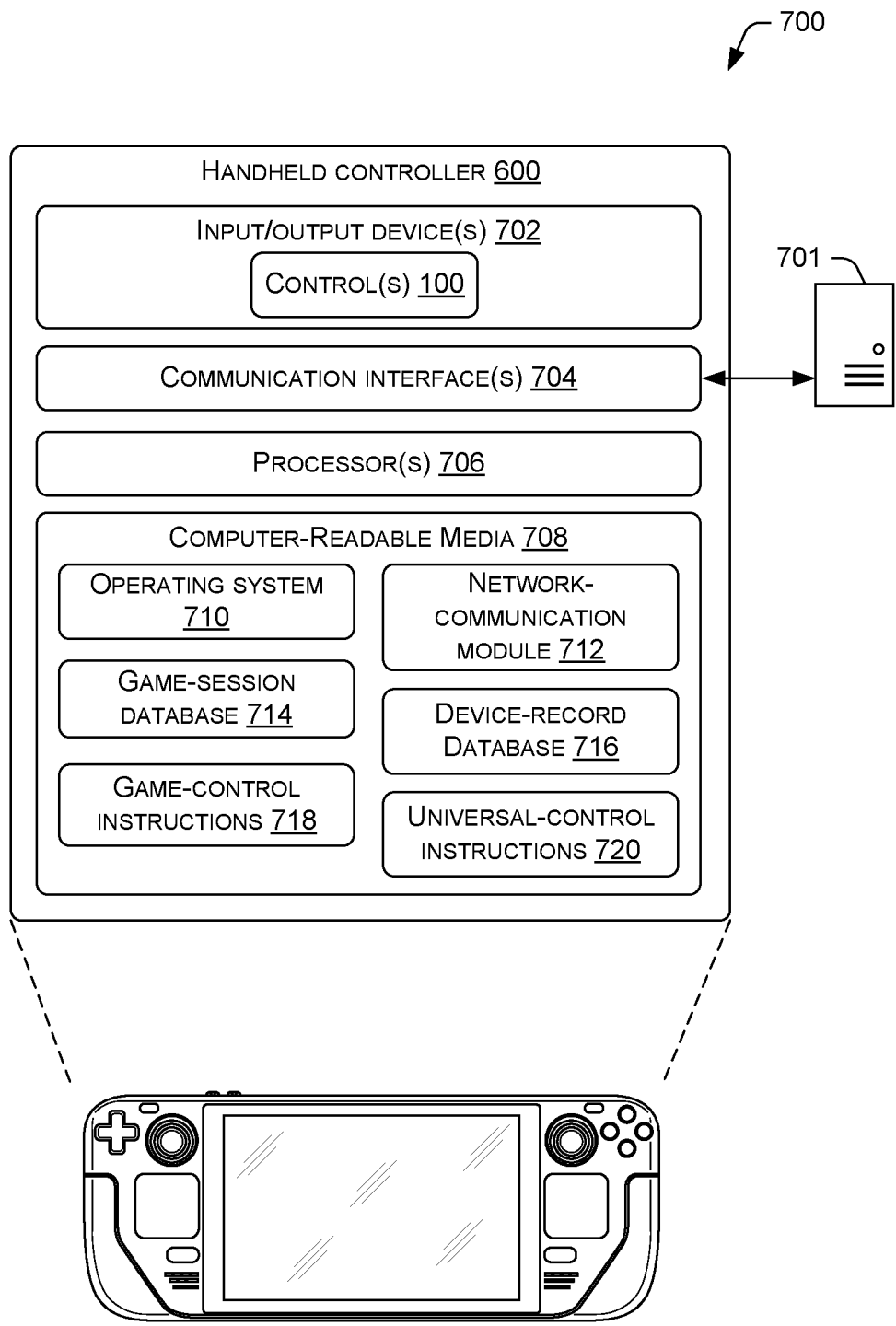
FIG. 7 illustrates example functional components of an example controller system.

FIG. 7 illustrates example functional components of an example controller system 700. As shown in FIG. 7, the controller system 700 may include one or more remote systems and/or devices 701 communicatively coupled to the handheld controller 600 of FIG. 6, which itself includes one or more controls 100, as described in detail above. As illustrated in FIG. 7, the controller 600 includes one or more input/output (I/O) devices 702, such as the controls 100, 604, 606, 608 described above, and potentially any other type of input or output devices. For example, the I/O devices 702 may include one or more microphones to receive audio input, such as user voice input. In some implementations, one or more cameras or other types of sensors (e.g., inertial measurement unit (IMU)) may function as input devices to receive gestural input, such as motion of the handheld controller 600. In some embodiments, additional input devices may be provided in the form of a keyboard, keypad, mouse, touch screen, joystick, control buttons and the like. The input device(s) may further include control mechanisms, such as basic volume control button(s) for increasing/decreasing volume, as well as power and reset buttons.

The output devices, meanwhile, may include a display 610, a light element (e.g., LED), a vibrator (e.g., the haptic actuator(s) 106 included in the control(s) 100) to create haptic sensations, a speaker(s) 614(1), 614(2), headphones, and/or the like. There may also be a simple light element (e.g., LED) to indicate a state such as, for example, when power is on and/or functionalities of the controller (e.g., modes). While a few examples have been provided, the controller 600 may additionally or alternatively include any other type of output device.

In some instances, output by the one or more output devices may be based on input received by one or more of the input devices. For example, selection of a control 100 may result in the output of a haptic response by a vibrator (e.g., haptic actuator 106) of the control 100 or at any other location within the housing 500 of the controller 600. In some instances, the output may vary based at least in part on a characteristic of a touch input on a touch sensor, such as the touch sensor associated with the control. For example, a touch input at a first location on the touch sensor may result in a first haptic output, while a touch input at a second location on the touch sensor may result in a second haptic output. Furthermore, a particular gesture on the touch sensor may result in a particular haptic output (or other type of output). For instance, a swipe gesture on the control may result in a first type of haptic output, while a tap on the control (detected by the touch sensor) may result in a second type of haptic output, while a hard press of the control may result in a third type of haptic output. Additionally, certain controls or portions of the controls may be illuminated based on received inputs.

In addition, the handheld controller 600 may include one or more communication interfaces 704 to facilitate a wireless connection to a network and/or to one or more remote systems and/or devices 701 (e.g., a host computing device executing an application, a game console, etc.). The communication interfaces 704 may implement one or more of various wireless technologies, such as Wi-Fi, Bluetooth, radio frequency (RF), and so on. It is to be appreciated that the handheld controller 600 may further include physical ports to facilitate a wired connection to a network, a connected peripheral device, or a plug-in network device that communicates with other wireless networks.

In the illustrated implementation, the handheld controller 600 further includes one or more processors 706 and computer-readable media 708. In some implementations, the processors(s) 706 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 706 may possess its own local memory, which also may store program modules, program data, and/or one or more operating systems.

The computer-readable media 708 may include volatile and nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, redundant array of independent disks (RAID) storage systems, or any other medium which can be used to store the desired information and which can be accessed by a computing device. The computer-readable media 708 may be implemented as computer-readable storage media (CRSM), which may be any available physical media accessible by the processor(s) 706 to execute instructions stored on the computer-readable media 708. In one basic implementation, CRSM may include RAM and Flash memory. In other implementations, CRSM may include, but is not limited to, ROM, EEPROM, or any other tangible medium which can be used to store the desired information and which can be accessed by the processor(s) 706.

Several modules such as instruction, datastores, and so forth may be stored within the computer-readable media 708 and configured to execute on the processor(s) 706. A few example functional modules are shown as stored in the computer-readable media 708 and executed on the processor(s) 706, although the same functionality may alternatively be implemented in hardware, firmware, or as a system on a chip (SOC).

An operating system module 710 may be configured to manage hardware within and coupled to the handheld controller 600 for the benefit of other modules. In addition, the computer-readable media 708 may store a network-communications module 712 that enables the handheld controller 600 to communicate, via the communication interfaces 704, with one or more other devices 701, such as a personal computing device executing an application (e.g., a game application), a game console, a remote server, or the like. The computer-readable media 708 may further include a game-session database 714 to store data associated with a game (or other application) executing on the controller 600 or on a computing device to which the controller 600 couples. The computer-readable media 708 may also include a device-record database 716 that stores data associated with devices to which the controller 600 couples, such as the personal computing device, game console, remote server or the like. The computer-readable media 708 may further store game-control instructions 718 that configure the controller 600 to function as a gaming controller, and universal-control instructions 720) that configure the handheld controller 600 to function as a controller of other, non-gaming devices.

In some instances, some or all of the components (software) shown in FIG. 7 could be implemented on another computing device(s) 701 that is part of a controller system 700 including the controller 600. In such instances, the processes and/or functions described herein may be implemented by other computing devices 7001 and/or the controller 600. By way of example, the controller 600 may couple to a host PC or console in the same environment, a computing device(s)/server and provide the device 701 with data indicating presses, selections, and so forth received at the controller 600. The controller 600, for example, may transmit data indicating touch inputs received at a control 100 (e.g., trackpad) of the controller 600 to the computing device(s) 701, and the computing device(s) 701 may determine characteristics of the data and/or where the touch input is received on the controller 600 (or the control of the controller 600). The computing device 701 may then cause associated actions within a game or application to be performed, and/or the computing device 701 may cause associated output to be provided via output device(s), such as the haptic actuator(s) 106 of the control(s) 100, described in detail above. However, while a few scenarios are described, the controller 600 and the computing device(s) 701 may communicatively couple with one another for transmitting and receiving data such that the controller 600, the computing device 701, and/or other devices of the controller system 700 may perform the operations and processes described herein.

Unless otherwise indicated, all numbers expressing quantities, properties, conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value: ±19% of the stated value: ±18% of the stated value: ±17% of the stated value: ±16% of the stated value: ±15% of the stated value: ±14% of the stated value; ±13% of the stated value: ±12% of the stated value: ±11% of the stated value: ±10% of the stated value: ±9% of the stated value: ±8% of the stated value: ±7% of the stated value: ±6% of the stated value: ±5% of the stated value: ±4% of the stated value: ±3% of the stated value: ±2% of the stated value: or ±1% of the stated value.

While various examples and embodiments are described individually herein, the examples and embodiments may be combined, rearranged and modified to arrive at other variations within the scope of this disclosure. In addition, although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A controller system comprising:
a processor; and
a controller comprising:
a housing; and
a trackpad configured to be operated by a finger of a user of the controller, the trackpad comprising:
a cover;
a circuit board disposed behind the cover and coupled to the cover;
a haptic actuator mounted to the circuit board and configured to vibrate in response to a control signal from the processor, wherein the haptic actuator has a first resonant frequency; and
a spring disposed behind the cover, coupled to the cover, and mounted to the housing, wherein the spring is configured to deflect bidirectionally in response to a vibration of the haptic actuator,
wherein the trackpad has a second resonant frequency different than the first resonant frequency, and wherein the second resonant frequency is defined by a spring constant of the spring, a mass of the cover, a mass of the circuit board, and a mass of one or more components, including the haptic actuator, mounted to the circuit board.

2. The controller system of claim 1, wherein a difference between the first resonant frequency and the second resonant frequency is within a range of about 70 Hertz (Hz) to 160 Hz.

3. The controller system of claim 1, wherein the spring comprises:
a first elongate spring arm that is parallel, and adjacent, to a first side of the cover; and
a second elongate spring arm that is parallel, and adjacent, to a second side of the cover opposite the first side of the cover.

4. The controller system of claim 3, wherein:
the first elongate spring arm adjoins a body of the spring at a first neck region;
the second elongate spring arm adjoins the body of the spring at a second neck region;
the first neck region and the second neck region are substantially equal in length; and
the length is within a range of about 5 millimeters (mm) to 20 mm.

5. A trackpad of a controller, the trackpad comprising:
a cover;
a circuit board disposed behind the cover and coupled to the cover;
a haptic actuator mounted to the circuit board and configured to vibrate, wherein the haptic actuator has a first resonant frequency; and
a spring disposed behind the cover, coupled to the cover, and mounted to a housing of the controller, wherein the spring is configured to deflect bidirectionally in response to a vibration of the haptic actuator,
wherein the trackpad has a second resonant frequency different than the first resonant frequency, wherein the second resonant frequency is defined by a spring constant of the spring, a mass of the cover, a mass of the circuit board, and a mass of one or more components, including the haptic actuator, mounted to the circuit board.

6. The trackpad of claim 5, wherein a difference between the first resonant frequency and the second resonant frequency is within a range of about 70 Hertz (Hz) to 160 Hz.

7. The trackpad of claim 5, wherein the spring comprises:
a first elongate spring arm that is adjacent to a first side of the cover; and
a second elongate spring arm that is adjacent to a second side of the cover opposite the first side of the cover.

8. The trackpad of claim 7, wherein:
the first elongate spring arm comprises:
a first corner flange at a first end of the first elongate spring arm; and
a second corner flange at a second end of the first elongate spring arm; and
the second elongate spring arm comprises:
a third corner flange at a first end of the second elongate spring arm; and
a fourth corner flange at a second end of the second elongate spring arm,
wherein the spring is mounted to the housing via the first corner flange, the second corner flange, the third corner flange, and the fourth corner flange.

9. The trackpad of claim 7, wherein:
the first elongate spring arm adjoins a body of the spring at a first neck region; and
the second elongate spring arm adjoins the body of the spring at a second neck region.

10. The trackpad of claim 9, wherein:
the first neck region and the second neck region are substantially equal in length; and
the length is within a range of about 5 millimeters (mm) to 20 mm.

11. The trackpad of claim 9, wherein:
the first elongate spring arm comprises:
a first cantilever extending from the first neck region in a first direction; and
a second cantilever extending from the first neck region in a second direction opposite the first direction; and
the second elongate spring arm comprises:
a third cantilever extending from the second neck region in the first direction; and
a fourth cantilever extending from the second neck region in the second direction.

12. The trackpad of claim 5, wherein the spring is configured to apply a biasing force on the cover in an opposite direction to that of a force of a press on the cover by a user of the trackpad.

13. The trackpad of claim 5, wherein the spring is manufactured from a single piece of material.

14. The trackpad of claim 5, wherein the spring is coupled to the cover via:
a first side flange of the spring, the first side flange being coupled to a back of the cover at a first side of the cover; and
a second side flange of the spring, the second side flange being coupled to the back of the cover at a second side of the cover opposite the first side of the cover.

15. A controller system comprising:
a processor; and
a controller comprising:
   a housing; and
   a control configured to be operated by a finger, the control comprising:
      a cover;
      a circuit board disposed behind the cover and coupled to the cover;
      a haptic actuator mounted to the circuit board and configured to vibrate in response to a control signal from the processor, wherein the haptic actuator has a first resonant frequency; and
      a spring disposed behind the cover, coupled to the cover, and mounted to the housing, wherein the spring is configured to deflect bidirectionally in response to a vibration of the haptic actuator,
   wherein the control has a second resonant frequency different than the first resonant frequency, wherein the second resonant frequency is defined by a spring constant of the spring, a mass of the cover, a mass of the circuit board, and a mass of one or more components, including the haptic actuator, mounted to the circuit board.

16. The controller system of claim 15, wherein a difference between the first resonant frequency and the second resonant frequency is within a range of about 70 Hertz (Hz) to 160 Hz.

17. The controller system of claim 15, wherein the spring comprises:
   a first elongate spring arm that is adjacent to a first side of the cover; and
   a second elongate spring arm that is adjacent to a second side of the cover opposite the first side of the cover.

18. The controller system of claim 17, wherein:
   the first elongate spring arm adjoins a body of the spring at a first neck region; and
   the second elongate spring arm adjoins the body of the spring at a second neck region.

19. The controller system of claim 15, wherein the control comprises a trackpad.

20. The controller system of claim 15, wherein the spring is coupled to the cover via:
   a first side flange of the spring, the first side flange being coupled to a back of the cover at a first side of the cover; and
   a second side flange of the spring, the second side flange being coupled to the back of the cover at a second side of the cover opposite the first side of the cover.

\* \* \* \* \*